(12) United States Patent
Minami

(10) Patent No.: US 10,824,994 B2
(45) Date of Patent: Nov. 3, 2020

(54) ELECTRONIC BUSINESS FORM MANAGEMENT DEVICE, ELECTRONIC BUSINESS FORM MANAGEMENT METHOD, AND STORAGE MEDIUM

(71) Applicant: Casio Computer Co., Ltd., Tokyo (JP)

(72) Inventor: Kazuhiro Minami, Kawaguchi (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 16/013,084

(22) Filed: Jun. 20, 2018

(65) Prior Publication Data

US 2018/0374048 A1  Dec. 27, 2018

(30) Foreign Application Priority Data

Jun. 26, 2017 (JP) ................. 2017-124297

(51) Int. Cl.
*G06Q 10/10* (2012.01)
*G06F 21/30* (2013.01)
*H04L 29/06* (2006.01)
*H04L 9/32* (2006.01)
*G06F 21/10* (2013.01)
(Continued)

(52) U.S. Cl.
CPC ........... *G06Q 10/10* (2013.01); *G06F 3/0482* (2013.01); *G06F 21/10* (2013.01); *G06F 21/30* (2013.01);
(Continued)

(58) Field of Classification Search
CPC ...... G06F 17/60; G06F 17/248; G06F 40/186; G06F 21/10; G06F 21/30; G06F 3/0483;
(Continued)

(56) References Cited

U.S. PATENT DOCUMENTS

2002/0184123 A1* 12/2002 Sijacic .................. G06Q 10/10
705/34
2003/0145276 A1* 7/2003 Hirata .................... G06Q 10/10
715/234
(Continued)

FOREIGN PATENT DOCUMENTS

JP  2004-213072 A  7/2004
JP     3735724 B1  1/2006
(Continued)

OTHER PUBLICATIONS

EPO; EP Application No. 18178837.3; European Search Report dated Sep. 20, 2018.
(Continued)

*Primary Examiner* — Eric J. Bycer
(74) *Attorney, Agent, or Firm* — Fitch, Even, Tabin & Flannery LLP

(57) ABSTRACT

An information processing device including a processor that functions as: a receiving section which receives, from a first user terminal, a display request of an electronic document on which a display restriction is imposed, the display request being accompanied by an intended use of the electronic document; an approval section which receives approval of the display request that is received by the receiving section; and a setting section which sets a restriction removal condition that is determined in advance in association with the intended use accompanying the display request when the approval section receives the approval of the display request.

7 Claims, 22 Drawing Sheets

(51) Int. Cl.
*H04W 12/06* (2009.01)
*H04W 12/08* (2009.01)
*G06F 40/186* (2020.01)
*G06F 3/0482* (2013.01)

(52) U.S. Cl.
CPC .............. *G06F 40/186* (2020.01); *H04L 9/32* (2013.01); *H04L 63/08* (2013.01); *H04L 63/10* (2013.01); *H04W 12/06* (2013.01); *H04W 12/08* (2013.01)

(58) Field of Classification Search
CPC ........... H04L 9/32; H04L 63/08; H04L 63/10; G06Q 10/10; H04W 12/06; H04W 12/08
See application file for complete search history.

(56) References Cited

U.S. PATENT DOCUMENTS

2007/0234069 A1* 10/2007 Ginter .................... G06F 21/10
713/189

2012/0036440 A1* 2/2012 Dare ......................... G06F 9/54
715/734
2013/0082819 A1 4/2013 Cotterill
2017/0149829 A1* 5/2017 Oshurkov .............. H04L 63/20

FOREIGN PATENT DOCUMENTS

| JP | 2010-015542 | A | 1/2010 | |
| JP | 2012-014283 | * | 1/2012 | ............ G06Q 10/06 |
| JP | 2012014283 | A | 1/2012 | |
| JP | 5785352 | B1 | 9/2015 | |

OTHER PUBLICATIONS

JPO; Application No. 2017-124297; Notice of Reasons for Refusal dated Oct. 29, 2019.
JPO; Application No. 2017-124297; Notice of Reasons for Refusal dated May 26, 2020.

* cited by examiner

FIG.9

USE REQUEST SCREEN

PERSONNEL INFORMATION MANAGEMENT SYSTEM

| REQUESTER NAME | SATO ICHIRO | — A3 |
| EMAIL ADDRESS | xxx.yyy@abc.com | — A4 |
| EMPLOYEE NUMBER | 001234 | — A5 |
| USING DATE AND TIME (START) | APRIL 18, 2017 | 10:00 | — A6 |
| USING DATE AND TIME (END) | APRIL 18, 2017 | 17:00 | — A7 |

[TO ITEM SELECTION SCREEN] — B7
[RETURN] — B8

INTENDED USE

- 1 GENERAL CLERICAL WORK
- 2 ACCOUNTING
- 3 TRADE
- 4 LABOR
- 5 TEMPORARY TRANSFER
- 101 INDIVIDUAL NUMBER
- 201 ENTIRE ANALYSIS
- 202 INDIVIDUAL ANALYSIS

EMPLOYEE SELECTION

SEARCH CONDITION [SEARCH]

EMPLOYEE BOOK (FORM 1) | EMPLOYEE BOOK (FORM 2)

SAMPLE

NAME
EMAIL
OFFICE TEL   HOME TEL
EDUCATION  SCHOOL   FACULTY    DEPARTMENT
UNIVERSITY GRADUATION
PREVIOUS COMPANY                JOB TYPE   REMARKS
INTRODUCER
GUARANTOR 1                              TEL
GUARANTOR 2                              TEL
EMERGENCY CONTACT PERSON                 TEL
FAMILY CONTACT PERSON                    TEL
NAME OF FAMILY  RELATIONSHIP SEX BIRTH DATE AGE  PLACE OF EMPLOYMENT  REMARKS  DEATH DATE

[RETURN]

ITEM SELECTION

- 1000 BASIC INFORMATION
- 1010 NAME
- 1020 FAMILY
- 1030 FAMILY, EDUCATION
- ...

FIG.11

| INTENDED USE | |
|---|---|
| 1 | GENERAL CLERICAL WORK |
| 2 | ACCOUNTING |
| 3 | TRADE |
| 4 | LABOR |
| 5 | TEMPORARY TRANSFER |
| 101 | INDIVIDUAL NUMBER |
| 201 | ENTIRE ANALYSIS |
| 202 | INDIVIDUAL ANALYSIS |
| ... | |

EMPLOYEE SELECTION
SEARCH CONDITION [SEARCH]

EMPLOYEE BOOK (FORM 1) | EMPLOYEE BOOK (FORM 2)

SAMPLE
NAME: 
BIRTH DATE: :

[HISTORY OF SALARY RAISE]
| DATE | ENTITLEMENT | AMOUNT | REMARKS |
|---|---|---|---|

[HISTORY OF ASSESSMENT]
| DATE | CLASSIFICATION | RATING | RATING MARK | REMARKS |
|---|---|---|---|---|

[HISTORY OF REWARD AND PUNISHMENT]
| DATE | SECTION | REWARD AND PUNISHMENT | REMARKS |
|---|---|---|---|

[SELF REPORT]
| DATE | CLASSIFICATION | REPORT CONTENTS | REMARKS | FORM |
|---|---|---|---|---|

NAME

RETURN

ITEM SELECTION
- 1000 BASIC INFORMATION
- 1010 NAME
- 1020 FAMILY
- 1030 FAMILY, EDUCATION
- ...

| BUSINESS FORM CODE | 1 | 2 |
|---|---|---|
| BUSINESS FORM NAME | EMPLOYEE BOOK (FORM 1) | EMPLOYEE BOOK (FORM2) |
| PIXEL X | 1375 | 1375 |
| PIXEL Y | 971 | 971 |
| REFERENCE RATE | 1.2 | 1.2 |

| EMPLOYEE CODE | 1001 | 1002 | 1003 | 1004 | 1005 | ... |
|---|---|---|---|---|---|---|
| EMPLOYEE NAME | AOKI SHIGERU | AOKI JIRO | AOKI SABURO | AOKI SHIRO | AOKI GORO | ... |
| ... | ... | ... | ... | ... | ... | ... |
| SEX | MALE | MALE | MALE | MALE | MALE | ... |
| BIRTH DATE | 1955/8/1 | 1965/10/1 | 1975/11/1 | 1985/12/1 | 1995/1/1 | ... |

| ITEM CODE | 1000 | 1010 | 1020 | 1030 | 1030 | ... |
|---|---|---|---|---|---|---|
| ITEM NAME | BASIC INFORMATION | NAME | FAMILY | FAMILY, EDUCATION | FAMILY, EDUCATION | ... |
| BRANCH NUMBER | 0 | 0 | 0 | 0 | 1 | ... |
| BUSINESS FORM CODE | 1 | 1 | 1 | 1 | 2 | ... |
| START POINT COORDINATE X | x11 | x12 | x13 | x14 | x31 | ... |
| START POINT COORDINATE Y | y11 | y12 | y13 | y14 | y31 | ... |
| END POINT COORDINATE X | x21 | x22 | x23 | x24 | x41 | ... |
| END POINT COORDINATE Y | y21 | y22 | y23 | y24 | y41 | ... |

| INTENDED USE CODE | 1 | 2 | 3 | 4 | 5 | 101 | 201 | 202 | ... |
|---|---|---|---|---|---|---|---|---|---|
| INTENDED USE NAME | GENERAL CLERICAL WORK | ACCOUNTING | TRADE | LABOR | TEMPORAL TRANSFER | INDIVIDUAL NUMBER | ENTIRE ANALYSIS | INDIVIDUAL ANALYSIS | ... |
| RESTRICTION REMOVAL METHOD | 1 | 1 | 1 | 2 | 2 | 3 | 2 | 2 | ... |

| INTENDED USE CODE | 1 | 1 | 2 | 2 | 3 | 3 | 4 | 4 | ... |
|---|---|---|---|---|---|---|---|---|---|
| EMPLOYEE CODE | 1001 | 1002 | 1002 | 1003 | 1003 | 1004 | 1004 | 1005 | ... |

| INTENDED USE CODE | 1 | 1 | 2 | 2 | 3 | 3 | 4 | 4 | ... |
|---|---|---|---|---|---|---|---|---|---|
| ITEM CODE | 1020 | 1030 | 1020 | 1030 | 1020 | 1030 | 1020 | 1030 | ... |

USE REQUEST SCREEN

PERSONNEL INFORMATION MANAGEMENT SYSTEM

| | |
|---|---|
| REQUESTER NAME | SATO ICHIRO — A3 |
| EMAIL ADDRESS | xxx.yyy@abc.com — A4 |
| EMPLOYEE NUMBER | 001234 — A5 |
| USING DATE AND TIME (START) | APRIL 18, 2017    10:00 — A6 |
| USING DATE AND TIME (END) | APRIL 18, 2017    17:00 — A7 |
| INTENDED USE | 1 GENERAL CLERICAL WORK; EMPLOYEE BOOK (FORM 1) |
| USE TARGET PERSON | 1001 AOKI SHIGERU; EMPLOYEE BOOK (FORM 1) |
| USE TARGET ITEM | 1020 FAMILY; EMPLOYEE BOOK (FORM 1) |

REQUEST (B13)    TO SELECTION SCREEN (B7)    RETURN (B8)

FIG.16

REQUEST STATUS LIST SCREEN

PERSONNEL INFORMATION MANAGEMENT SYSTEM

| REQUEST NO. | LOGIN ACCOUNT | USING DATE AND TIME (START) | USING DATE AND TIME (END) | STATUS |
|---|---|---|---|---|
| 001 | user01 | 2017/4/18 10:00 | 2017/4/18 17:00 | NOT APPROVED |

TO REQUEST SCREEN (B5)    LOGOUT (B6)

FIG.17A

<sub>13j</sub>

| EMPLOYEE CODE | 1001 |
|---|---|
| LOGIN ACCOUNT | user01 |
| REQUEST NO. | 1 |
| REQUEST DATE AND TIME | 2017/3/31 10:10 |
| STATUS | NOT APPROVED |
| INTENDED USE CODE | 1 |

FIG.17B

<sub>13k</sub>

| ITEM CODE | 1020 |
|---|---|
| LOGIN ACCOUNT | user01 |
| REQUEST NO. | 1 |
| REQUEST DATE AND TIME | 2017/3/31 10:10 |
| STATUS | NOT APPROVED |
| INTENDED USE CODE | 1 |

FIG.18

From: PERSONNEL INFORMATION MANAGEMENT SYSTEM
　　　〈formsender@abcjinji.com〉
Sent: Tuesday, April 18 9:48 AM
To: xxx.yyy@abc.com
Subject: APPROVAL FOR REQUEST FOR USE OF PERSONNEL
　　　　　INFORMATION MANAGEMENT SYSTEM YOUR REQUEST FOR USE OF PERSONNEL INFORMATION
MANAGEMENT SYSTEM FOR THE PERIOD BELOW HAS BEEN
APPROVED.

USABLE PERIOD(START) : 2017/4/18 10:00
USABLE PERIOD(END) : 2017/4/18 17:00

FIG.19

REQUEST STATUS LIST SCREEN

PERSONNEL INFORMATION MANAGEMENT SYSTEM

| REQUEST NO. | LOGIN ACCOUNT | USING DATE AND TIME (START) | USING DATE AND TIME (END) | STATUS |
|---|---|---|---|---|
| 001 | user01 | 2017/4/18 10:00 | 2017/4/18 17:00 | APPROVED |

TO REQUEST SCREEN — B5

LOGOUT — B6

REFERABLE ITEM
1020:FAMILY

B14
RETURN

54

1001 AOKI SHIGERU

| NAME OF FAMILY | RELATIONSHIP | SEX | BIRTH DATE | AGE | ... | ... |
|---|---|---|---|---|---|---|
| AOKI TADAO | FATHER | | S9. 9. 25 | 80 | | |
| AOKI HISAKO | MOTHER | | S14. 7. 7 | 51 | | 1 |
| AOKI HIROSHI | OLDER BROTHER | | S31. 9. 9 | 58 | | 2 |

D

REQUEST NO. 1

1001 AOKI SHIGERU

FIG.22A

| RESTRICTION REMOVAL METHOD | 1 | 2 | 3 |
|---|---|---|---|
| NAME OF RESTRICTION REMOVAL METHOD | EMPLOYEE INFORMATION | REGISTRATION KEYWORD | ONE-TIME PASSWORD |

| SERIAL NUMBER | 1 | 2 | 3 | 4 |
|---|---|---|---|---|
| ITEM NAME | EMPLOYEE NUMBER | BIRTH DATE | PHONE NUMBER | NAME OF SPOUSE |
| REFERENCE ITEM NAME | EMPLOYEE TABLE (EMPLOYEE NUMBER) | EMPLOYEE TABLE (BIRTH DATE) | EMPLOYEE TABLE (PHONE NUMBER) | EMPLOYEE TABLE (NAME OF SPOUSE) |

| LOGIN ACCOUNT | COMMON | COMMON | user01 | user01 | ... |
|---|---|---|---|---|---|
| KEYWORD NO. | 1 | 2 | 1 | 2 | ... |
| QUESTION | WHAT IS NAME OF PRESIDENT? | WHEN IS ANNIVERSARY OF ESTABLISHMENT? | WHAT IS YOUR PARENT'S NAME? | WHAT IS YOUR LAST ACADEMIC RECORD? | ... |
| ANSWER | TANAKA ICHIRO | S30. 4. 1 | REFER TO EMPLOYEE TABLE | REFER TO EMPLOYEE TABLE | ... |

PERSONNEL INFORMATION MANAGEMENT SYSTEM

A14 — ID OR EMAIL ADDRESS

A15 — PASSWORD

B17 — LOGIN

| APPROVAL SCREEN | |
|---|---|
| PERSONNEL INFORMATION MANAGEMENT SYSTEM | REQUEST NO.001 |
| REQUESTER NAME | SATO ICHIRO |
| EMAIL ADDRESS | xxx.yyy@abc.com |
| EMPLOYEE NUMBER | 001234 |
| USING DATE AND TIME (START) | APRIL 18, 2017 / 10:00 |
| USING DATE AND TIME (END) | APRIL 18, 2017 / 17:00 |
| INTENDED USE | 1 GENERAL CLERICAL WORK; EMPLOYEE BOOK (FORM 1) |
| USE TARGET PERSON | 1001 AOKI SHIGERU; EMPLOYEE BOOK (FORM 1) |
| USE TARGET ITEM | 1020 FAMILY; EMPLOYEE BOOK (FORM 1) |

TO SELECTION APPROVAL SCREEN — B23

RETURN — B24

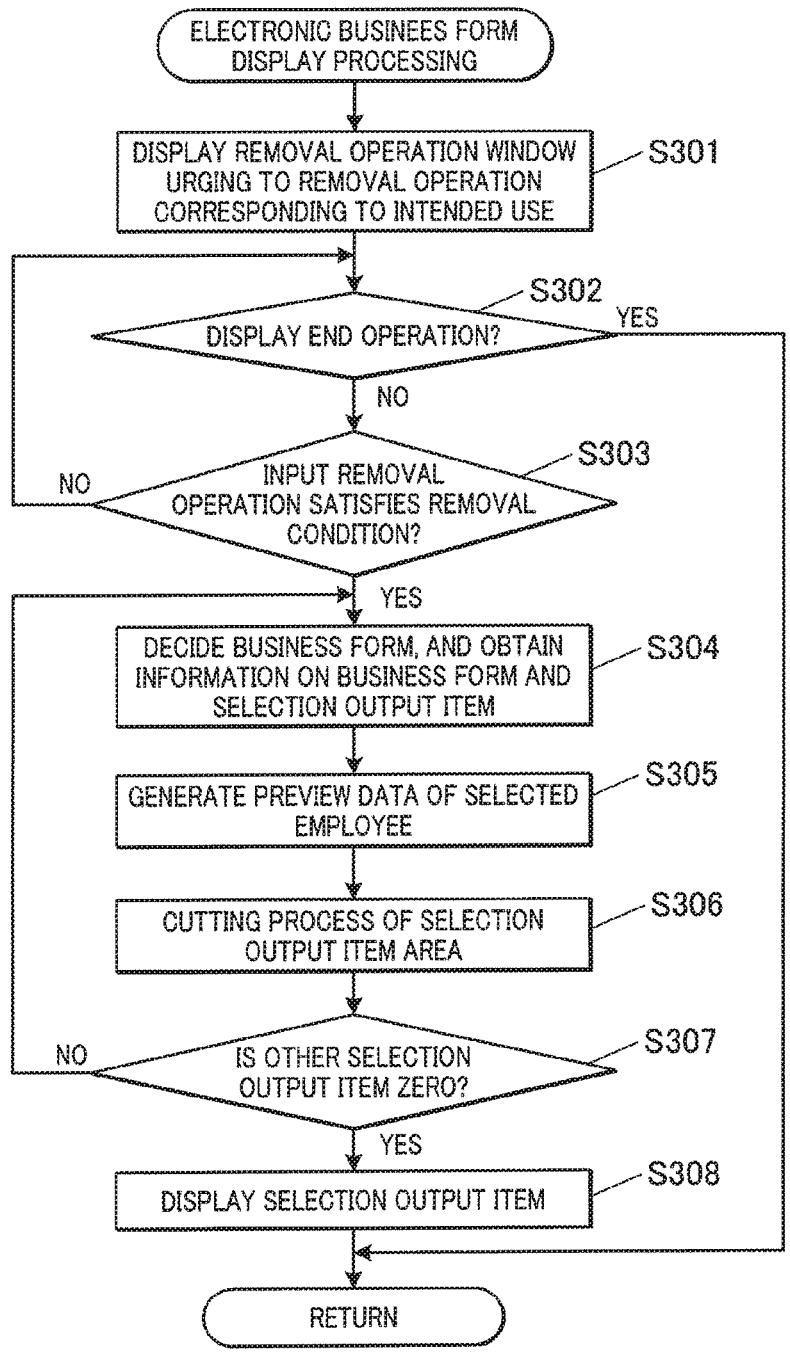

ELECTRONIC BUSINESS FORM MANAGEMENT DEVICE, ELECTRONIC BUSINESS FORM MANAGEMENT METHOD, AND STORAGE MEDIUM

CROSS-REFERENCE TO RELATED APPLICATIONS

The entire disclosure of Japanese Patent Application No. 2017-124297 filed on Jun. 26, 2017 including description, claims, drawings, and abstract are incorporated herein by reference in its entirety.

BACKGROUND OF THE INVENTION

1. Field of the Invention

The present invention relates to an information processing device, an information processing method and a storage medium.

2. Description of Related Art

There have been conventionally information processing devices which can display part of registration information in databases as electronic documents such as electronic business forms. Examples of such information processing devices include a server device which provides a personnel information management system capable of registering and editing various types of data regarding employees and displaying and printing the data as electronic documents.

Such a type of information processing device handles highly confidential information in many cases. Thus, there is a technique in which a request to view an electronic document is made in order to view the electronic document, and the user is permitted to view the electronic document only when the request is approved by an approver (for example, Japanese Patent Application Laid Open Publication No. 2012-14283).

However, in the above conventional technique, a third party other than the person who made the request can also easily view the electronic document since the approved electronic document can be viewed without any restrictions after approval by the approver. That is, there is a problem that authentication is not sufficient when the approved electronic document is displayed.

SUMMARY OF THE INVENTION

In order to solve the above problems, according to an aspect of the present invention, there is provided an information processing device including a processor that functions as: a receiving section which receives, from a first user terminal, a display request of an electronic document on which a display restriction is imposed, the display request being accompanied by an intended use of the electronic document; an approval section which receives approval of the display request that is received by the receiving section; and a setting section which sets a restriction removal condition that is determined in advance in association with the intended use accompanying the display request when the approval section receives the approval of the display request.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein:

FIG. 9 is a view showing a use request screen of the personnel information management system;

FIG. 10 is a view showing an item selection screen of the personnel information management system;

FIG. 11 is a view showing an item selection screen of the personnel information management system;

FIG. 12 is a view showing an item selection screen of the personnel information management system;

FIG. 13A is a view showing a content example of a business form output table;

FIG. 13B is a view showing a content example of an employee table;

FIG. 13C is a view showing a content example of an output item table;

FIG. 14A is a view showing a content example of an intended use table;

FIG. 14B is a view showing a content example of an intended use employee table;

FIG. 14C is a view showing a content example of an intended use output item table;

FIG. 15 is a view showing a use request screen of the personnel information management system;

FIG. 16 is a view showing a request status list screen after use request;

FIG. 17A is a view showing a content example of an request employee table;

FIG. 17B is a view showing a content example of an request output item table;

FIG. 18 is a view showing a content example of an email which is transmitted when the use request is approved;

FIG. 19 is a view showing a request status list screen in a state in which the use request is approved;

FIG. 21 is a view showing a viewing screen of the personnel information management system;

FIG. 22A is a view showing a content example of a restriction removal table;

FIG. 22B is a view showing a content example of a restriction item table;

FIG. 22C is a view showing a content example of a keyword table;

FIG. 23 is a view showing a login screen for performing login by a first login method to the personnel information management system;

FIG. 26 is a view showing an approval screen;

FIG. 30 is a flowchart showing a control procedure of electronic business form display processing.

DETAILED DESCRIPTION OF THE PREFERRED EMBODIMENT

<Configuration of Information Processing System>

First, the schematic configuration of the information processing system 100 will be described with reference to FIG. 1.

Figure 1:
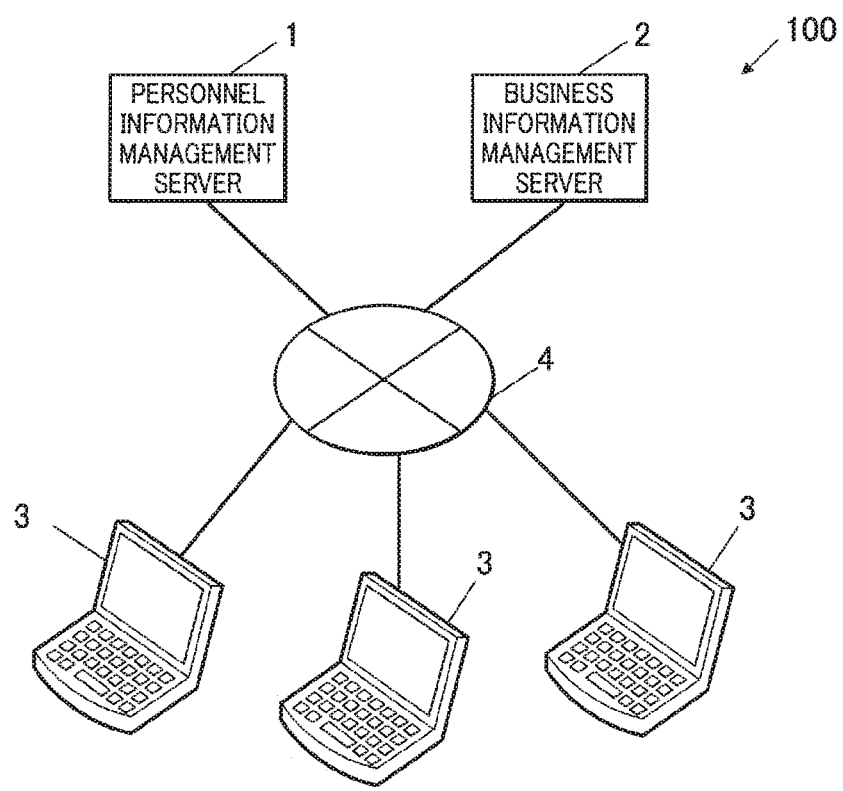
FIG. 1 is a view showing the schematic configuration of an information processing system.

FIG. 1 is a view showing the schematic configuration of the information processing system 100.

As shown in FIG. 1, the information processing system 100 in the embodiment includes a personnel information management server 1 (information processing device), a business information management server 2 and a plurality of terminal devices 3 (first user terminal and a second user terminal). The personnel information management server 1, the business information management server 2 and the terminal devices 3 are connected so as to communicate information with each other via a communication network 4.

The personnel information management server 1 provides, to a user, a cloud service of the personnel information management system for managing personnel information of employees and the like, and the business information management server 2 provides, to the user, a cloud service of the business information management system for managing information regarding various types of business affairs (for example, information on business affairs regarding health insurance society). The personnel information management system and the business information management system are accessible when authentication succeeds with respective separate authentication information. Accordingly, login to the business information management system cannot be performed with the authentication information for the personnel information management system, and login to the personnel information management system cannot be performed with the authentication information for the business information management system. However, the user who performed login to the business information management system can use a part of the function of the personnel information management system even when the user does not possess authentication information for the personnel information management system. On the other hand, the user who performed login to the personnel information management system can use a part of the function of the business information management system even when the user does not possess authentication information for the business information management system. That is, the personnel information management system and the business information management system are in a relationship capable of mutually using the functions of the respective systems. The embodiment is described by, for simplicity, explaining a configuration that is necessary when a user who performed login to the business information management system uses the function of the personnel information management system. However, actually, each of the personnel information management server 1 and the business information management server 2 has the configuration enabling the above-mentioned mutual use. The operation which is performed in a case of such mutual use of the functions of the respective systems will be described in detail later.

The personnel information management server 1 stores and manages a personnel information database regarding personnel information. The personnel information management server 1 performs various types of data processing (for example, processing for achieving functions regarding registering and editing the personnel information data and displaying and printing the data as electronic business forms (electronic documents) and the like) regarding the personnel information database by executing various programs.

The business information management server 2 stores and manages the business information database. The business information management server 2 performs various types of data processing (for example, processing for achieving functions regarding registering and editing the business information data and displaying and printing the data as electronic business forms and the like) regarding the business information database by executing various programs.

The terminal device 3 is, for example, a terminal device which is carried by a user of the personnel information management system and the business information management system. The terminal device 3 is, for example, a smartphone, a tablet PC (Personal Computer), a mobile phone, a PDA (Personal Digital Assistant), a notebook PC, a desktop PC or the like.

The terminal device 3 receives user's input operation, transmits the input operation to the personnel information management server 1 and the business information management server 2, and displays information which was transmitted from each server and received.

Though the communication network 4 is, for example, the Internet, the communication network 4 may be other networks such as LAN (Local Area Network).

Figure 2:
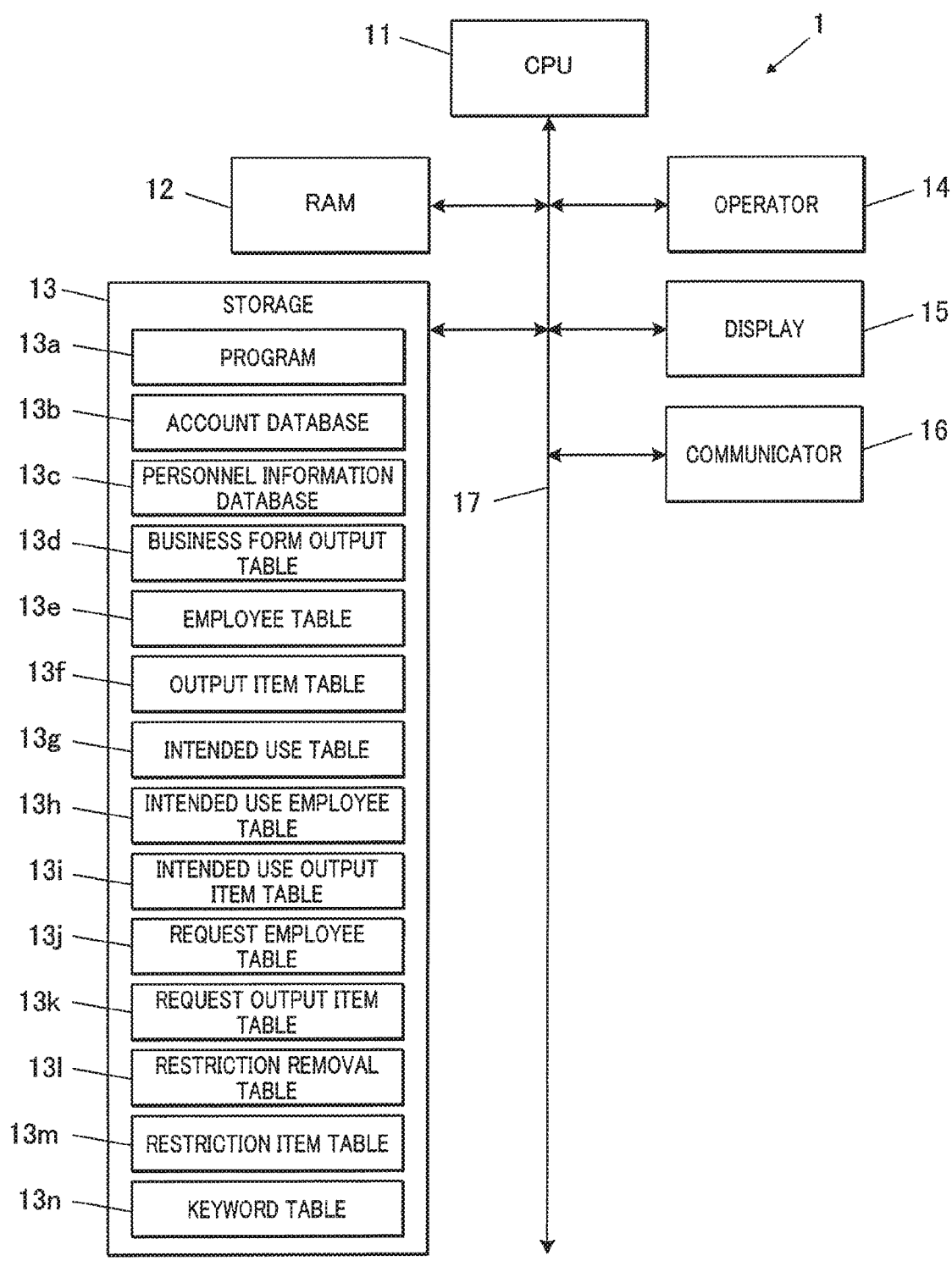
FIG. 2 is a block diagram showing the functional configuration of a personnel information management server.

FIG. 2 is a block diagram showing the functional configuration of the personnel information management server 1.

As shown in FIG. 2, the personnel information management server 1 includes a CPU 11 (Central Processing Unit) (receiving section, approval section, setting section, notification section, determination section, restriction removal section and display control section), a RAM 12 (Random Access Memory), a storage 13, an operator 14, a display 15 and a communicator 16. The components in the personnel information management server 1 are connected to each other via a bus 17.

The CPU 11 controls the components in the personnel information management server 1. The CPU 11 reads out a specified program from among system programs and application programs stored in the storage 13, loads the program onto the working area of the RAM 12 and executes various types of processing in accordance with the program.

The RAM 12 is a volatile memory, for example, and has a working area which temporarily stores various types of programs and data read by the CPU 11.

The storage 13 is a storage which is configured by including, for example, an HDD (Hard Disk Drive), an SSD (Solid State Drive) or the like, and allows writing and reading of the data and the programs. The storage 13 stores a program 13a, an account database 13b, a personnel information database 13c, a business form output table 13d, an employee table 13e, an output item table 13f, an intended use table 13g, an intended use employee table 13h, an intended use output item table 13i, a request employee table 13j, a request output item table 13k, a restriction removal table 13l, a restriction item table 13m, a keyword table 13n and the like.

The program 13a includes the above-mentioned various system programs and application programs executed by the CPU 11.

Information regarding accounts (hereinafter, also referred to as personnel accounts) of users of the personnel information management system is registered in the account database 13b. Here, the information regarding the account includes an ID, an email address and a password which are unique to each account. In the embodiment, the authentication information is formed by a combination of the ID or the email address and the password.

The personnel information database 13c is a database in which the personnel information of management target in the personnel information management system is registered.

Each of the above tables 13d to 13n is table data which is used in use request (display request) of an electronic business form (for example, employee book), in display of the electronic business form for which the use request was performed and the like. The details regarding the tables 13d to 13n will be described later.

The operator 14 has a key input section such as a keyboard and a pointing device such as a mouse, for example. The operator 14 receives the key input and the position input and outputs the operation information to the CPU 11.

The display 15 is configured by including an LCD (Liquid Crystal Display) or an organic EL (Electro-Luminescence) display, for example. On the display 15, there are displayed various screens in accordance with the instruction of a display signal which was input from the CPU 11.

The communicator 16 is configured by including a network card, for example. The communicator 16 is communicably connected to the communication network 4, and performs communication with a device (for example, the terminal device 3) on the communication network 4.

Figure 3:
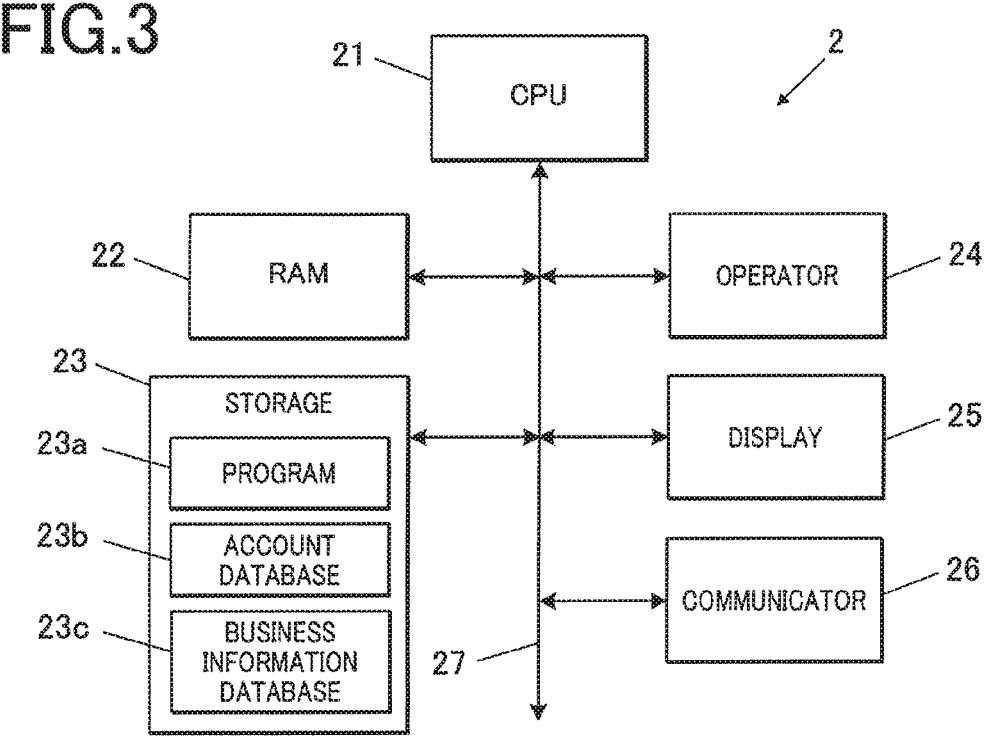
FIG. 3 is a block diagram showing the functional configuration of a business information management server.

FIG. 3 is a block diagram showing the function configuration of the business information management server 2.

As shown in FIG. 3, the business information management server 2 includes a CPU 21, a RAM 22, a storage 23, an operator 24, a display 25 and a communicator 26. The components in the business information management server 2 are connected to each other via a bus 27.

The CPU 21 controls the components in the business information management server 2. The CPU 21 reads out a specified program from among system programs and application programs stored in the storage 23, loads the program onto the working area of the RAM 22 and executes various types of processing in accordance with the program.

The RAM 22 is a volatile memory, for example, and has a working area which temporarily stores various types of programs and data read by the CPU 21.

The storage 23 is a storage which is configured by including, for example, an HDD, an SSD or the like, and allows writing and reading of the data and the programs. The storage 23 stores a program 23a, an account database 23b, a business information database 23c and the like.

The program 23a includes the above-mentioned various system programs and application programs executed by the CPU 21.

Information regarding accounts (hereinafter, also referred to as business accounts) of users of the business information management system is registered in the account database 23b. Here, the information regarding the account includes an ID, an email address and a password which are unique to each account.

The business information database 23c is a database in which the business information of management target in the business information management system is registered.

Since the configurations of the operator 24, the display 25 and the communicator 26 are similar to the configurations of the operator 14, the display 15 and the communicator 16 in the personnel information management server 1, the detailed explanation is omitted.

Figure 4:
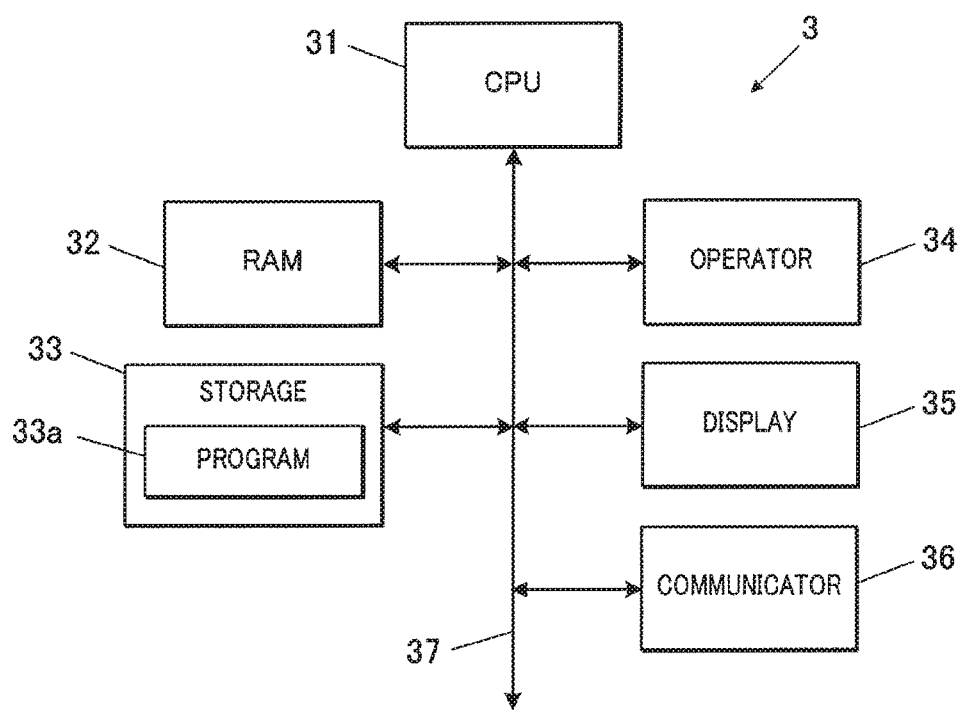
FIG. 4 is a block diagram showing the functional configuration of a terminal device.

FIG. 4 is a block diagram showing the functional configuration of the terminal device 3.

As shown in FIG. 4, the terminal device 3 includes a CPU 31, a RAM 32, a storage 33, an operator 34, a display 35 (display) and a communicator 36. The components in the terminal device 3 are connected to each other via a bus 37.

The CPU 31 controls the components in the terminal device 3. The CPU 31 reads out a specified program from among system programs and application programs stored in the storage 33, loads the program onto the working area of the RAM 32 and executes various types of processing in accordance with the program. At that time, the CPU 31 performs control to store various types of processing results in the RAM 32, and performs control to display the processing results on the display 35 as needed.

The RAM 32 is a volatile memory, for example, and has a working area which temporarily stores various types of programs and data read by the CPU 31.

The storage 33 is a storage which is configured by including, for example, an HDD, an SSD or the like, and allows writing and reading of the data and the programs. The storage 33 stores a program 33a. The program 33a includes the above-mentioned various system programs and application programs executed by the CPU 31. The application program includes, for example, an information display input program (what is called web browser) for achieving the function of receiving user's input operation, transmitting the information based on the input operation to the personnel information management server 1 or the business information management server 2, and displaying the information which was transmitted and received from each server on the display 35.

Since the configurations of the operator 34, the display 35 and the communicator 36 are similar to the configurations of the operator 14, the display 15 and the communicator 16 in the personnel information management server 1, the detailed explanation is omitted.

Next, methods for login to the personnel information management system and the business information management system will be described.

Figure 5:
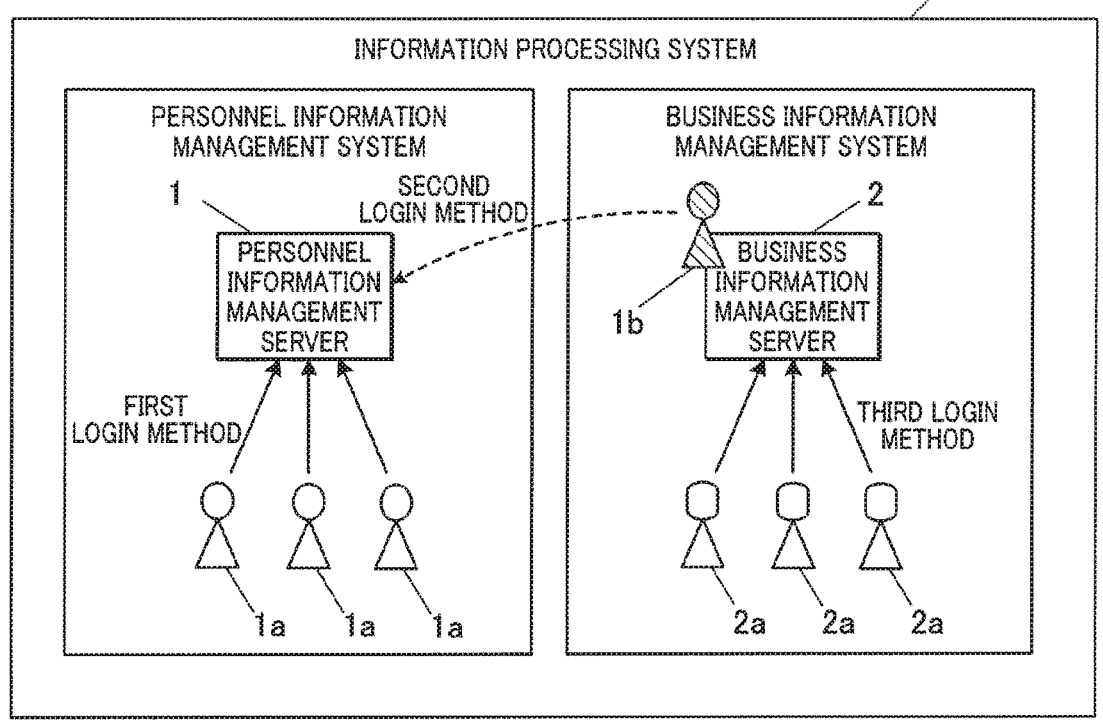
FIG. 5 is a schematic view for explaining a login method in the personnel information management system and the business information management system.

FIG. 5 is a schematic view for explaining login methods to the personnel information management system and the business information management system.

As shown on the left side of FIG. 5, in the information processing system 100 in the embodiment, it is possible to perform login to the personnel information management system with the personnel information management server 1 by using the personnel account 1a. Specifically, when it is determined that the authentication information which was input in the terminal device 3 and transmitted to the personnel information management server 1 matches authentication information of any one of the personnel accounts 1a registered in the account database 13b, the login processing to the personnel information management system is performed to start a login session.

Hereinafter, such a login method to the personnel information management system is also referred to as a first login method.

As shown on the right side of FIG. 5, it is possible to perform login to the business information management system with the business information management server 2 by using the business account 2a. Specifically, when it is determined that the authentication information which was input in the terminal device 3 and transmitted to the business information management server 2 matches authentication information of any one of the business accounts 2a registered in the account database 23b, login processing to the business information management system is performed to start a login session.

The personnel account 1a which is able to log in to the personnel information management system is managed by the account database 13b of the personnel information management server 1, and the business account 2a which is able to log in to the business information management system is managed by the account database 23b of the business information management server 2. Thus, the authentication information which is able to log in to the business information management system is prevented from logging in to the personnel information management system.

However, there is a case where a user who owns the business account 2a in the business information management system (hereinafter, referred to as a business information management system user) needs to be allowed to access the personnel information management system, such as a case where information in the personnel information management system is necessary for the work in the business information management system. In such a case, if another personnel account 1a for the personnel information management system is issued to the business information management system user, there is a problem that the number of accounts increase, which increases the management load of the accounts. In such a method, there is also a problem that it is not possible to treat the requirement to control the disclosure range of the personnel information in the personnel information management system with respect to the business information management system user.

Thus, the information processing system 100 in the embodiment enables the user to log in to the personnel information management system via the business information management system by performing a predetermined operation in the business information management system after logging in to the business information management system with the business account 2a, and requires another authentication for viewing the personnel information in the case of login via the business information management system. Thus, it is possible to suppress the increase in the number of accounts of the personnel information management system, while controlling the disclosure of personnel information to the business information management system user. Hereinafter, the method for logging in to the personnel information management system via the business information management system is also referred to as a second login method. Here, as shown in FIG. 5, a dedicated account 1b which can be used in the second login method only is used when login is performed to the personnel information management system by the second login method. Hereinafter, the method for logging in to the business information management system with the business account 2a is also referred to as a third login method.

Hereinafter, the second login method to the personnel information management system will be described in detail.

Figure 6:
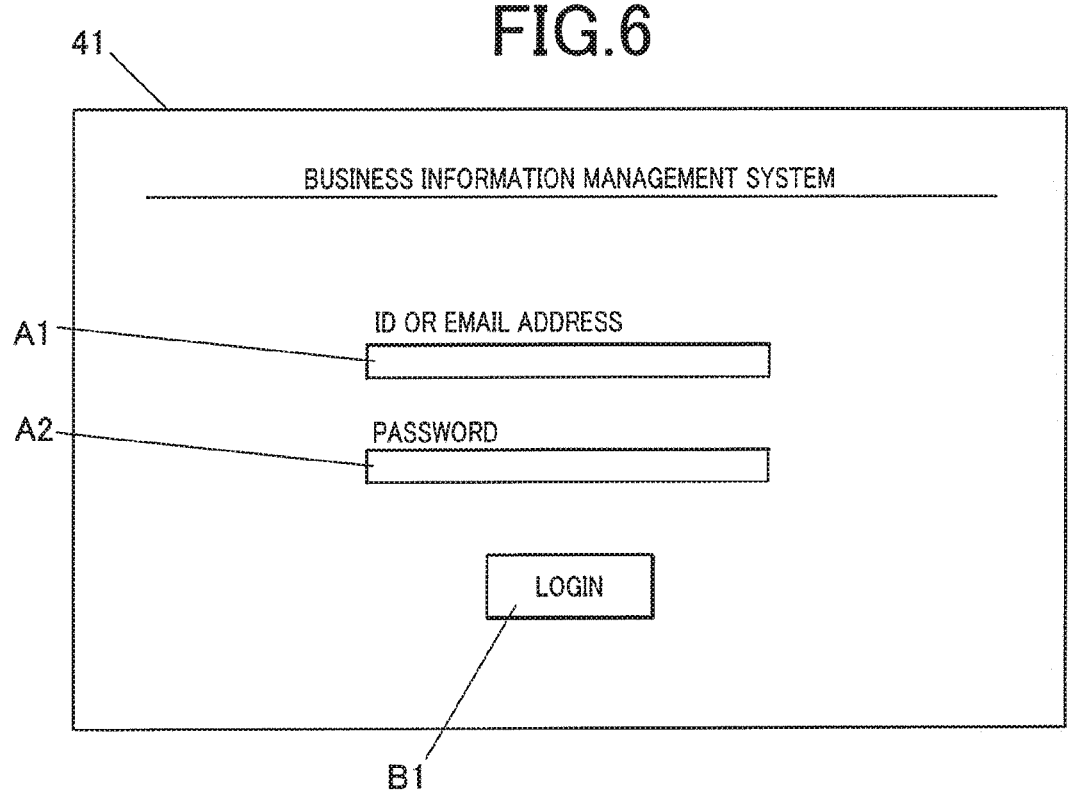
FIG. 6 is a view showing a login screen for performing login to the business information management system.

FIG. 6 is a view showing a login screen 41 for logging in to the business information management system.

The login screen 41 is a screen displayed on the display 35 when a program of browser is executed in the terminal device 3 and the user accesses a predetermined website for performing login to the business information management system by the business information management server 2. On the login screen 41, there are displayed a text box A1 to input an ID or an email address of the business account 2a used for login, a text box A2 to input a password and a login button B1.

By the input operation to the operator 34 of the terminal device 3, the ID or the email address is input to the text box A1, and the password is input to the text box A2. In this state, when an input operation to select the login button B1 is performed, the input authentication information is transmitted to the business information management server 2, and checked against the authentication information stored in the account database 23b. In a case where the input authentication information matches authentication information of any one of the business accounts 2a which are registered (in a case where the authentication information is determined to be appropriate), the CPU 21 of the business information management server 2 performs login processing to the business information management system with the business account 2a to start a login session (third login method).

Figure 7:
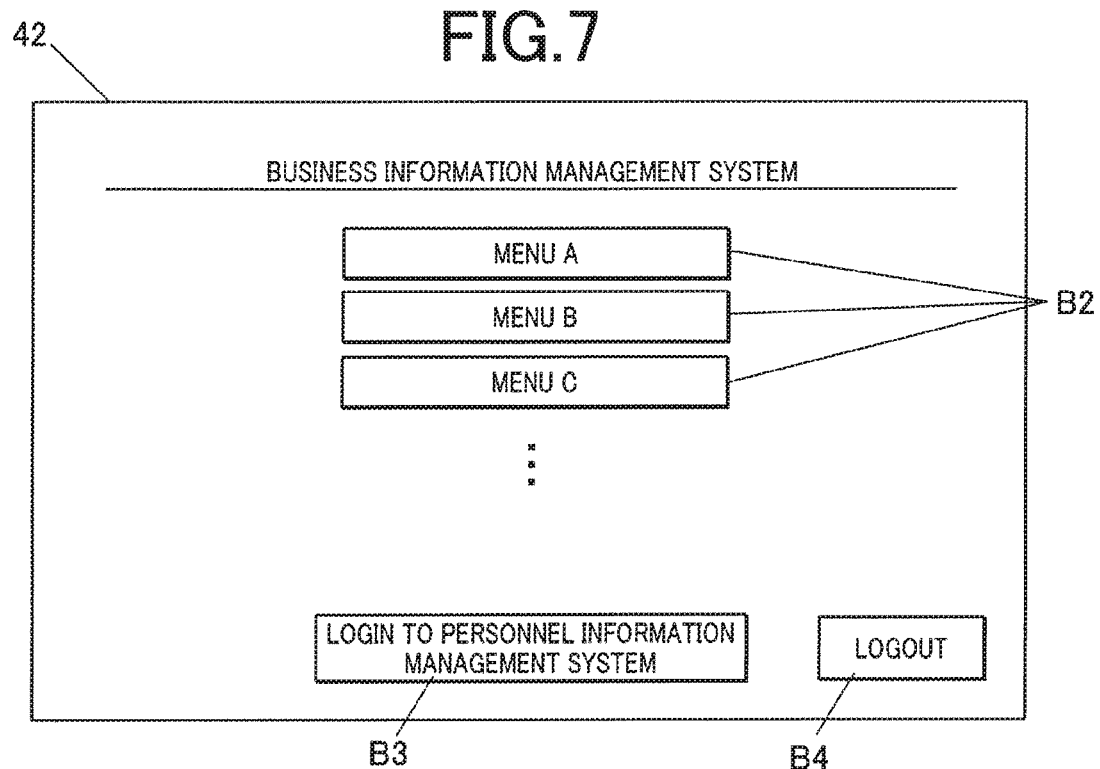
FIG. 7 is a view showing a business information management menu screen.

FIG. 7 is a view showing a business information management menu screen 42 in a case of login to the business information management system.

On the business information management menu screen 42 (top screen of the business information management system), there are displayed menu buttons B2 for executing various functions regarding the business information management, a login button B3 for performing login to the personnel information management system by the second login method and a logout button B4 for logging out from the business information management system.

On the business information management menu screen 42, when an input operation to select the login button B3 is performed, login to the personnel information management system by the second login method is performed.

In the login by the second login method, on the personnel information management system side, the login processing is performed with the above-mentioned dedicated account 1b (hereinafter, the name of the dedicated account 1b is described as "user01") which is used for a case of login via the business information management system.

Figure 8:
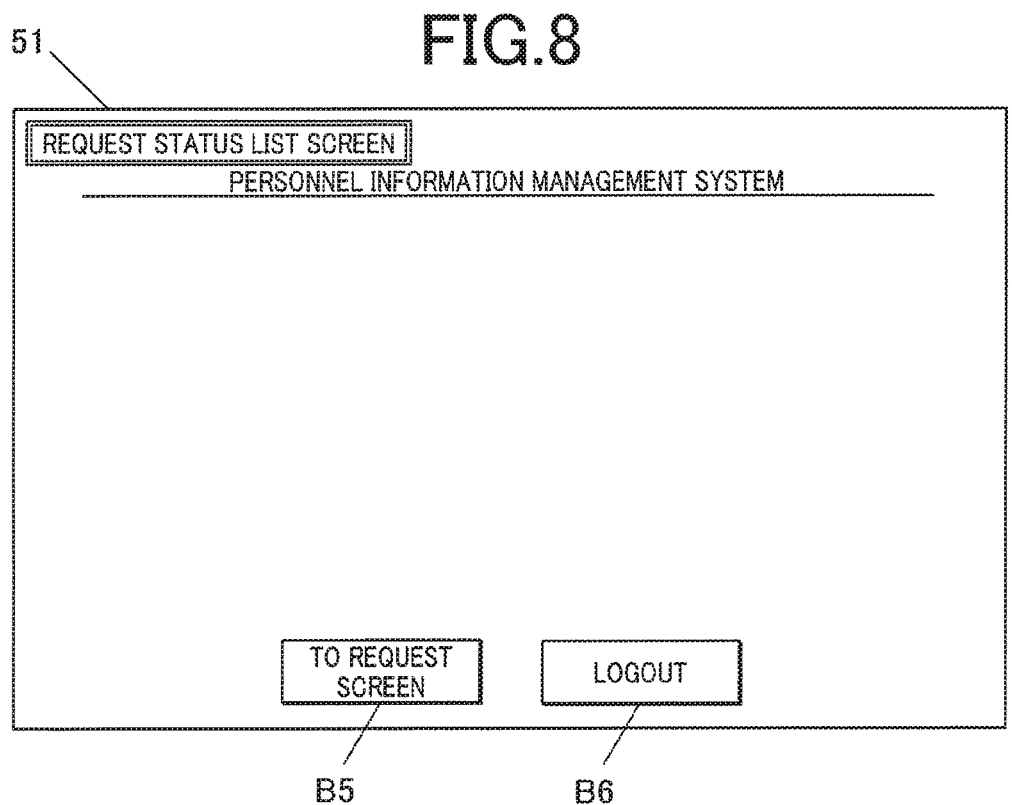
FIG. 8 is a view showing an initial screen (request status list screen) in a case where login is performed to the personnel information management system via the business information management system.

FIG. 8 is a view showing an initial screen in a case of login to the personnel information management system via the business information management system.

The initial screen is a request status list screen 51 which displays a list of use request statuses of the personnel information in the personnel information management system by the business information management system user who logged in by the second login method. At this state, since the use request is not performed yet, displaying regarding request statuses is not performed, and there are displayed only a request screen display button B5 for making a request to use the personnel information in the personnel information management system and a logout button B6 for logging out from the personnel information management system. By the business information management system user performing an input operation to select the request screen display button B5, the use request screen for the use request of the personnel information management system can be displayed.

FIG. 9 is a view showing the use request screen 52 in the personnel information management system.

On the use request screen 52, there are displayed a text box A3 to input a requester name, a text box A4 to input an email address of the requester, a text box A5 to input an employee number of the requester, a text box A6 to input using start date and time, a text box A7 to input using end date and time, an item selection screen display button B7 for displaying the item selection screen to select the use target item (output item), use target person (employee) and intended use indicating the purpose of use, and a return button B8 for returning to the request status list screen 51.

Figure 12:
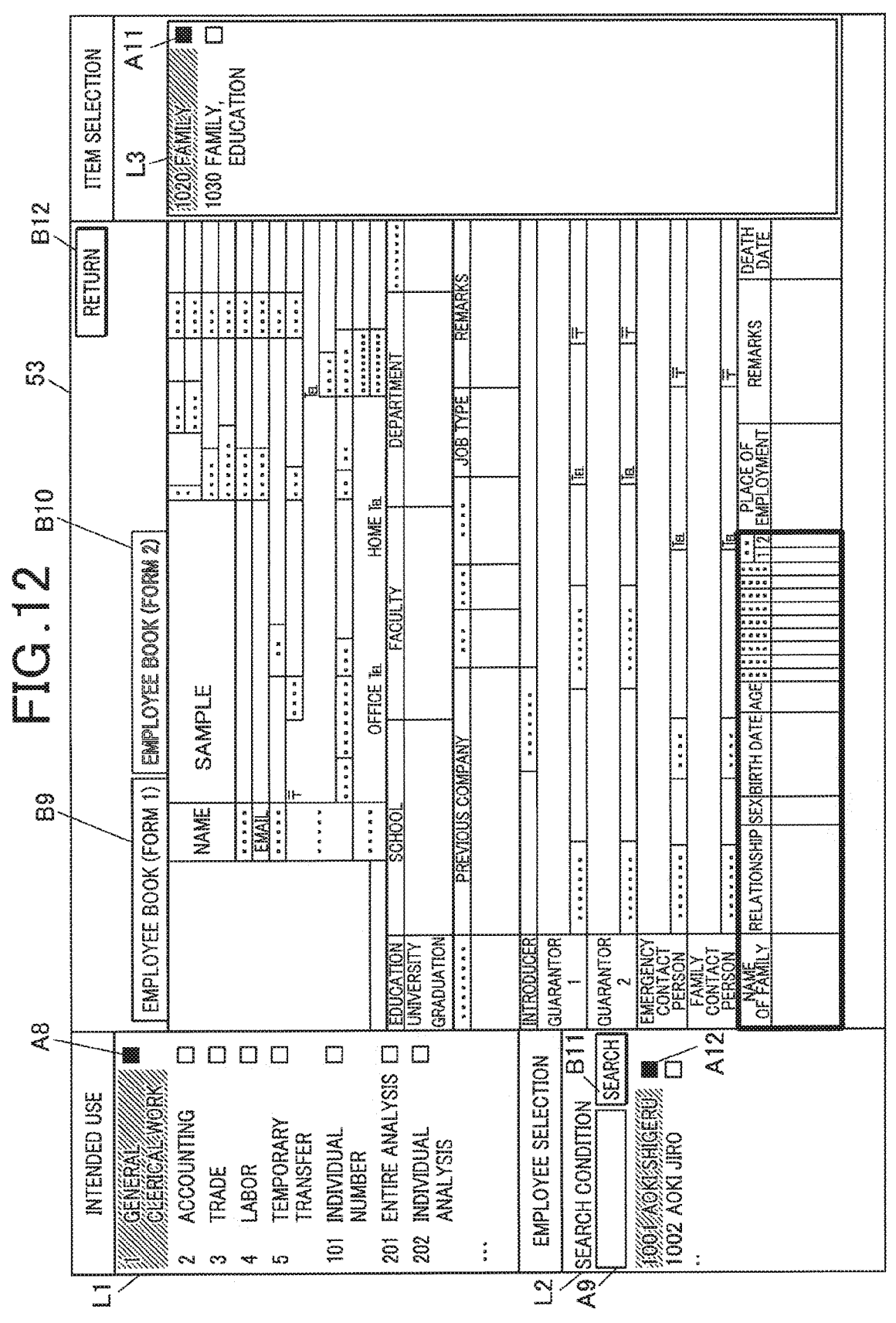

FIGS. 10 and 11 are views showing the item selection screen 53 before selection operation of the personnel information management system, and FIG. 12 is a view showing an example of the item selection screen 53 after the selection operation of the personnel information management system.

At the center of the item selection screen 53, a sample can be displayed by switching between a sample (template) of an employee book (form 1) shown in FIG. 10 and a sample (template) of an employee book (form 2) shown in FIG. 11. The business information management system user can display a desired sample on the item selection screen 53 by performing an input operation of selecting one of the tabs B9 and B10 which are displayed in association with these samples. This displaying is performed on the basis of the business form output table 13d stored in the storage 13 in the personnel information management server 1.

FIG. 13A is a view showing the content example of the business form output table 13d.

In the business form output table 13d, for each business form which is output, there are set a "business form code" indicating an identification number of the business form, a "business form name" indicating a name of the business form, a "pixel X" indicating the number of pixels in the X (horizontal) direction of the business form, a "pixel Y" indicating the number of pixels in the Y (vertical) direction of the business form, a "reference rate" indicating the display rate and the like.

On the item selection screen 53, it is possible to select the intended use by an input operation of business information management system user with reference to an intended use list L1 (first selection information) which was displayed in the upper section on the left side of the screen. The display of the intended use list L1 is made on the basis of information on "intended use code" and "intended use name" in the intended use table 13g stored in the storage 13 in the personnel information management server 1. In the example of FIG. 12, there is performed an input operation to select the check box A8 corresponding to "1 General Clerical Work" from among the plurality of intended uses, and "1 General Clerical Work" is selected as the intended use.

FIG. 14A is a view showing a content example of the intended use table 13g.

In the intended use table 13g, there are set, for each intended use, "intended use code" indicating the identification number of the intended use, "intended use name" indicating the name of the intended use, "restriction removal method" indicating the identification number of a restriction removal method and the like. The restriction removal method is a method for removing the display restriction on an electronic business form when the electronic business form is viewed. Specifically, there are set methods (see FIG. 22A) of inputting employee information, a registration keyword, a one-time password and the like.

On the item selection screen 53, it is possible to select a use target person (employee) by an input operation of the business information management system user with reference to an employee list L2 displayed in the lower section on the left side of the screen. The employee list L2 is displayed on the basis of information on the above-mentioned intended use table 13g, the intended use employee table 13h and "employee code" and "employee name" in the employee table 13e.

FIG. 14B is a view showing a content example of the intended use employee table 13h.

In the intended use employee table 13h, there are set above-mentioned "intended use code", "employee code" indicating the identification number of the employee and the like for each employee.

FIG. 13B is a view showing a content example of the employee table 13e.

In the employee table 13e, for each employee, there are set "employee code" indicating the identification number of the employee, "employee name" indicating the name of the employee, "sex" indicating the sex of the employee, "birth date" indicating the birth date of the employee and the like.

In the example of FIG. 12, since "1 General Clerical Work" is selected as the intended use as mentioned above, information of "AOKI SHIGERU" of the employee code "1001", "AOKI JIRO" of "1002" and the like associated with the intended use code "1" of the "General Clerical Work" is obtained from the intended use employee table 13h and the employee table 13e, and "1001 AOKI SHIGERU" and "1002 AOKI JIRO" and the like are displayed on the employee list L2. An input operation is performed to select the check box A12 corresponding to "1001 AOKI SHIGERU" in the employee list L2, and the "1001 AOKI SHIGERU" is selected as the use target person. In a case where many use target persons are displayed in the employee list L2, the use target persons are narrowed down by an input operation in the text box A9 for inputting a search text and the search button B11.

On the item selection screen 53, the use target item (output item) can be selected by an input operation of the business information management system user with reference to an item list L3 (second selection information) displayed on the right side of the screen. The item list L3 is displayed on the basis of information on the above-mentioned intended use table 13g, the intended use output item table 13i and "item code", "item name", "branch number" and "business form code" in the output item table 13f. The data for which "branch number" is set to be a number other than "0" is not displayed in the item list L3.

FIG. 14C is a view showing a content example of the intended use output item table 13i.

In the intended use output item table 13i, there are set the above-mentioned "intended use code", "item code" indicating the identification number of the output item and the like for each use target item (output item).

FIG. 13C is a view showing a content example of the output item table 13f.

In the output item table 13f, for each output item, there are set "item code" indicating the identification number of the output item, "item name" indicating the name of the output item, "branch number" indicating the branch number of the output item, "business form code" indicating the business form code of the business form including the output item, "start point coordinate X" indicating the start point (upper left) coordinate in the X direction of the area of the output item in the business form, "start point coordinate Y" indicating the start point coordinate in the Y direction of the area of the output item in the business form, "end point coordinate X" indicating the end point (lower right) coordinate in the X direction of the area of the output item in the business form, "end point coordinate Y" indicating the end point coordinate in the Y direction of the area of the output item in the business form, and the like.

In the example of FIG. 12, since "1 General Clerical Work" is selected as the intended use as mentioned above, there is obtained information on "family" of item code "1020" and "family•education" of the item code "1030" associated with the intended use code "1" of "general clerical work" from the intended use output item table 13*i* and the output item table 13*f*, and "1020 family" and "1030 family•education" are displayed in the item list L3. An input operation is performed to select the check box A11 corresponding to "1020 family" in the item list L3, and "1020 family" is selected as the use target item (output item). At this time, in accordance with the selection of "1020 family" as the use target item, the area of the item of "family" in the sample of employee book (form 1) is displayed in a thick frame. The thick frame display is performed on the basis of the information on the output item table 13*f*.

A return button B12 for returning to the use request screen 52 is displayed on the item selection screen 53.

On the item selection screen 53, when an input operation to select the return button B12 is performed in a state in which the use target person (employee) and the use target item (output item) are selected, as shown in FIG. 15, the screen is updated to the use request screen 52 reflecting the intended use, the use target person and the use target item selected on the above item selection screen 53. In the example of FIG. 15, "1 General Clerical Work" is selected as the intended use of the employee book (form 1), "1001 AOKI SHIGERU" is selected as the use target person of this employee book (form 1), and further "1020 family" is selected as the use target item. On the use request screen 52 in FIG. 15, in response to the reflection of the above intended use, use target person and the use target item, there is additionally displayed a request button B13 for executing use request with the contents displayed on the screen.

The business information management system user can make a use request of the personnel information system by performing an input operation of inputting necessary matters in the text boxes A3 to A7 and selecting the request button B13.

When the request button B13 is selected for use request, the request status list screen 51 is updated to be displayed on the display 35 as shown in FIG. 16. On the request status list screen 51 in FIG. 16, there are displayed "request No.", "login account", "using date and time (start and end)", "status" and the like for each use request which has been requested. Among them, the "status" indicates the approval status of request by a manager of the personnel information management system.

On the other hand, when the use request is performed by the use request screen 52, the request employee table 13*j* and the request output item table 13*k* are updated as shown in FIGS. 17A and 17B. In the request employee table 13*j* shown in FIG. 17A, information such as "employee code", "login account", "request No.", "request date and time", "status" and "intended use code" is registered for each use request which has been requested. Similarly, in the request output item table 13*k* in FIG. 17B, information such as "item code", "login account", "request No.", "request date and time", "status" and "intended use code" is registered for each use request which has been requested.

When the use request is performed by the use request screen 52, the input contents in the text boxes A3 to A7 and the intended use, use target person (employee) and use target item (output item) which were selected on the item selection screen 53 are notified to a predetermined manager of the personnel information management system. In response to this notification, when the manager performs predetermined approval processing for approving the use request, the personnel information management system becomes able to be used (electronic business form can be viewed) within the range corresponding to the contents of the use request. In addition, an email indicating that the use request was approved is transmitted to the email address of the requester which is input on the use request screen 52. Here, the manager may be a dedicated manager who manages the operation of the personnel information management system, or a user logging in to the personnel information management system may be able to approve the use request as the manager. The notification of the use request to the manager may be performed on the personnel information management system and may be performed by another system such as an email. The operation screen on the manager side of the personnel information management system will be described later.

FIG. 18 is a view showing a content example of the email transmitted to the email address of the business information management system user in a case where the use request was approved by the manager. Notification that the use request was approved is made by this email.

In a case where the use request was approved by the approver, the request status list screen 51 is updated as shown in FIG. 19. On the request status list screen 51 in FIG. 19, the status is updated to "approved" on the line of the approved use request. On the request status list screen 51, by performing an input operation to select the line of the approved use request, it is possible to display the electronic business form for which the use request was performed on the display 35. However, display restriction is imposed on the electronic business form, and the contents are not displayed unless the display restriction is removed.

Figure 20:
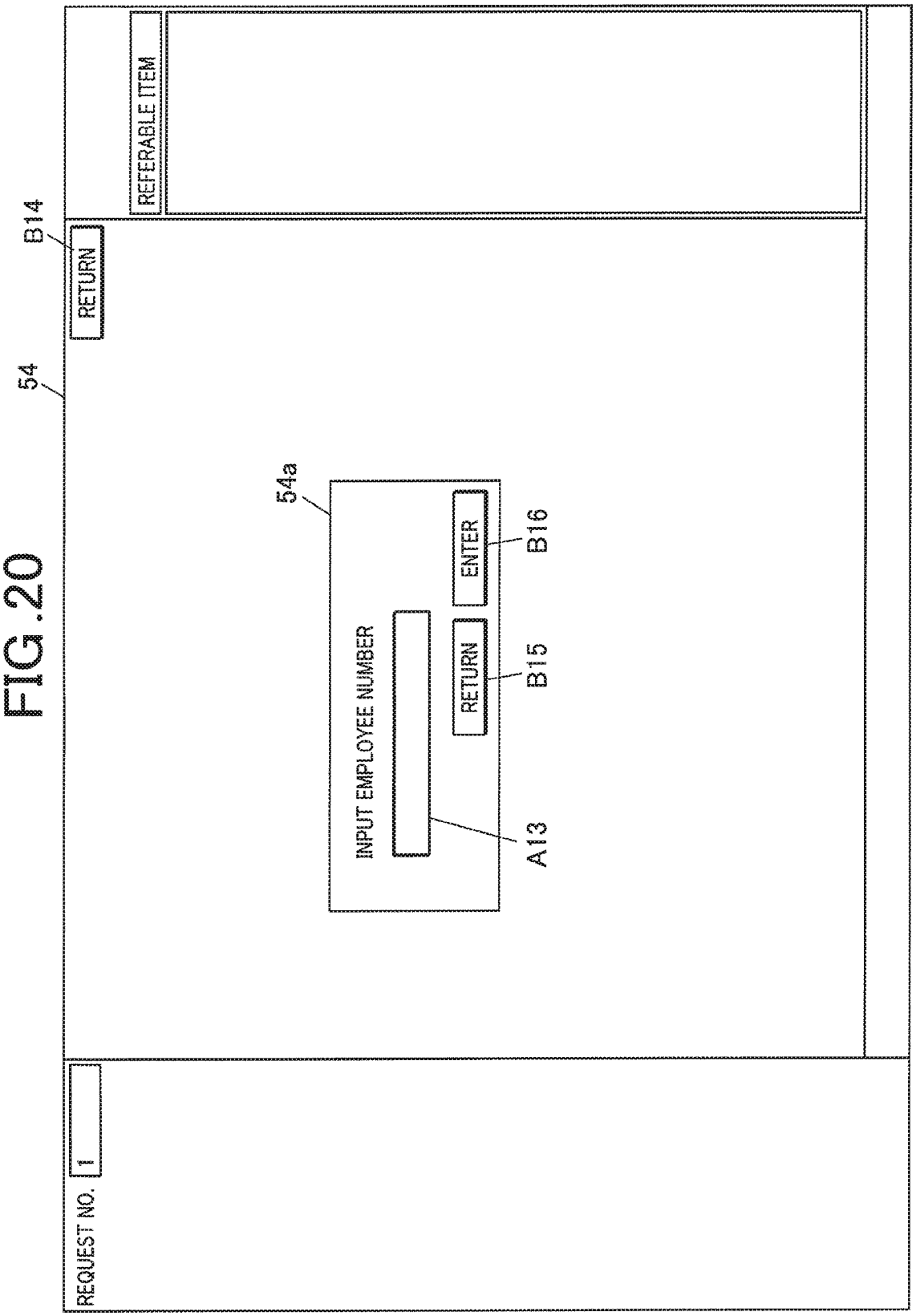
FIG. 20 is a view showing a viewing screen of the personnel information management system.

FIG. 20 is a view showing an example of a list screen in a state in which display restriction is imposed on the electronic business form. FIG. 21 is a view showing an example of a list screen in a state in which the display restriction is removed.

The list screen 54 in FIG. 20 is a screen which is displayed on the display 35 when the input operation is performed to select the line for which the "request No." is "001" on the request status list screen 51 in FIG. 19. On the list screen 54 in FIG. 20, there are displayed a removal operation window 54*a* urging the removal operation and the return button B45 B14 for returning to the request status list screen 51. The removal operation window 54*a* is made on the basis of the restriction removal table 13*l*, the restriction item table 13*m* and the keyword table 13*n* stored in the storage 13 of the personnel information management server 1.

FIGS. 22A to 22C are views showing the content examples of the restriction removal table 13*l*, the restriction item table 13*m* and the keyword table 13*n*.

In the restriction removal table 13*l* in FIG. 22A, there are set the "restriction removal method" indicating the identification number of the restriction removal method, "restriction removal method name" indicating the name of the restriction removal method and the like for each restriction removal method. Here, the "restriction removal method" is associated with the "restriction removal method" in the intended use table 13*g* in FIG. 14A. That is, the restriction removal method is selected according to the intended use selected at the time of use request. In a case where "one-time password" is selected as the restriction removal method, the one-time password is transmitted via email to the email address of the use requester.

The restriction item table 13*m* in FIG. 22B is table data for selecting the restriction item to cause the user to input on the removal operation window 54*a* in a case where the "employee information" of "1" is selected as the above "restriction removal method". In the restriction item table 13*m*, there are set, for each restriction item, "serial number" indicating the identification number of the restriction item, "item name" indicating the item name of the restriction item, "reference item name" indicating the name of the data table which is used for determining whether the data input on the removal operation window 54*a* satisfies the removal condition, and the like. Though the restriction item is selected randomly in the embodiment, the restriction item may be selected in the order of the "serial number".

The keyword table 13*n* in FIG. 22C is table data for selecting the question item to cause the user to input the registration keyword on the removal operation window 54*a* in a case where the "registration keyword" of "2" is selected as the above "restriction removal method". In the keyword table 13*n*, for each keyword, there are set "login account", "keyword No." indicating the keyword number, "question" indicating the question, "answer" indicating answer for determining whether the data input on the removal operation window 54*a* satisfies the removal condition, and the like. In the state of initial setting, "login account" is "common", and one of the two questions ("What is the name of the president?" and "When is the anniversary of establishment?") corresponding to "keyword Nos." of "1" and "2" is randomly selected. Each time a predetermined question (for example, "What is your parent's name?" or "What is your last academic record?") is registered in the keyword table 13*n* by the user, one of the questions including these questions is randomly selected. As for the registration keyword, in order to facilitate input by the use requester, the combination between the question and the answer may be described in advance in the email notifying the approval shown in FIG. 18.

On the removal operation window 54*a* in FIG. 20, there are displayed a text box A13 for inputting the employee number, a return button B15 for stopping display of the removal operation window 54*a*, and a decision button B16 for deciding the input contents in the text box A13. That is, the "employee information" of "1" is selected as the above "restriction removal method", and the restriction item of the "employee number" corresponding to the "serial number" of "1" is selected.

When an input operation is performed to select the decision button B16 in a state in which the employee number input on the use request screen 52 is input to the text box A13 on the removal operation window 54*a*, the display restriction is removed. As shown in FIG. 21, on the viewing screen 54 after removal, there are displayed selected contents (use target person (employee) and use target item (output item)) in the use request which was approved by the manager of the personnel information management system and the registration information D corresponding to the selected contents. This viewing screen 54 is displayed in accordance with the setting contents in the business form output table 13*d*, the employee table 13*e*, the output item table 13*f*, the request employee table 13*g* and the request output item table 13*h* stored in the storage 13 of the personnel information management server 1. In the example of FIG. 21, the registration information D corresponding to the use target person "1001 AOKI SHIGERU" and the use target item "1020 family" is displayed on the viewing screen 54.

Next, the screen display on the manager side of the personnel information management system will be described.

FIG. 23 is a view showing a login screen 55 for the manager of the personnel information management system to perform login by the first login method to the personnel information management system. On the login screen 55, there are displayed a text box A14 to input the ID or the email address of the personnel account 1*a* used for login, a text box A15 to input the password, and the login button B17. The ID or the email address is input to the text box A14, and the password is input to the test box A15. In this state, when an input operation to select the login button B17 is performed, the input authentication information is transmitted to the personnel information management server 1, and checked against the authentication information stored in the account database 13*b*. In a case where the input authentication information matches authentication information of any registered personnel account 1*a* (in a case where the input authentication information is determined to be appropriate), the CPU 11 of the personnel information management server 1 performs login processing to the business information management system with the personnel account 1*a* to start the login session.

Figure 24:
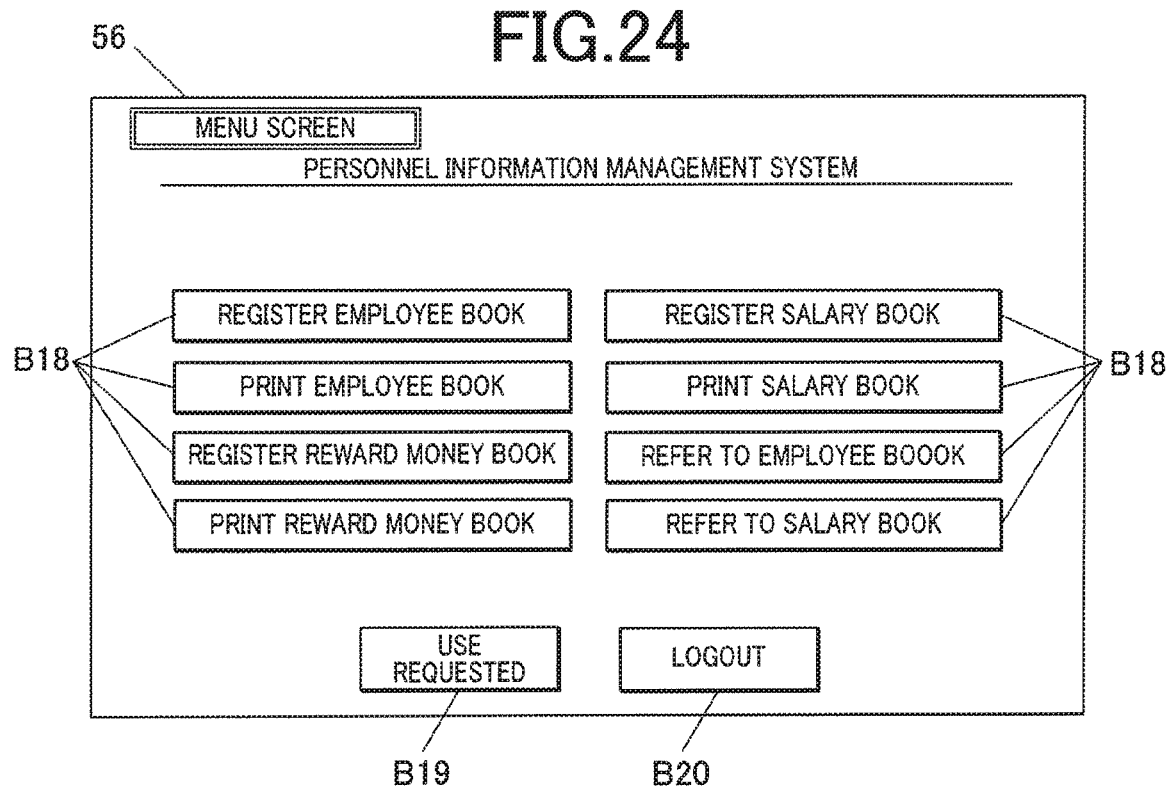
FIG. 24 is a view showing a personnel information management menu screen in a case of login to the personnel information management system by the first login method.

FIG. 24 is a view showing the personnel information management menu screen 56 in a case of login to the personnel information management system by the first login method. On the personnel information management menu screen 56, there are displayed menu buttons B18 for executing various functions of the personnel information management system, a use request display button B19 for displaying a request status list screen 57 (see FIG. 25) for use request of the personnel information management system from the business information management system user, and a logout button B20 for logging out from the personnel information management system. The use request display button B19 also has a function of informing the user of use request of the personnel information management system, and displayed only when the use request of the personnel information management system is performed. Alternatively, the use request display button B19 may be displayed constantly and may be emphasized when the use request of the personnel information management system is performed.

Figure 25:
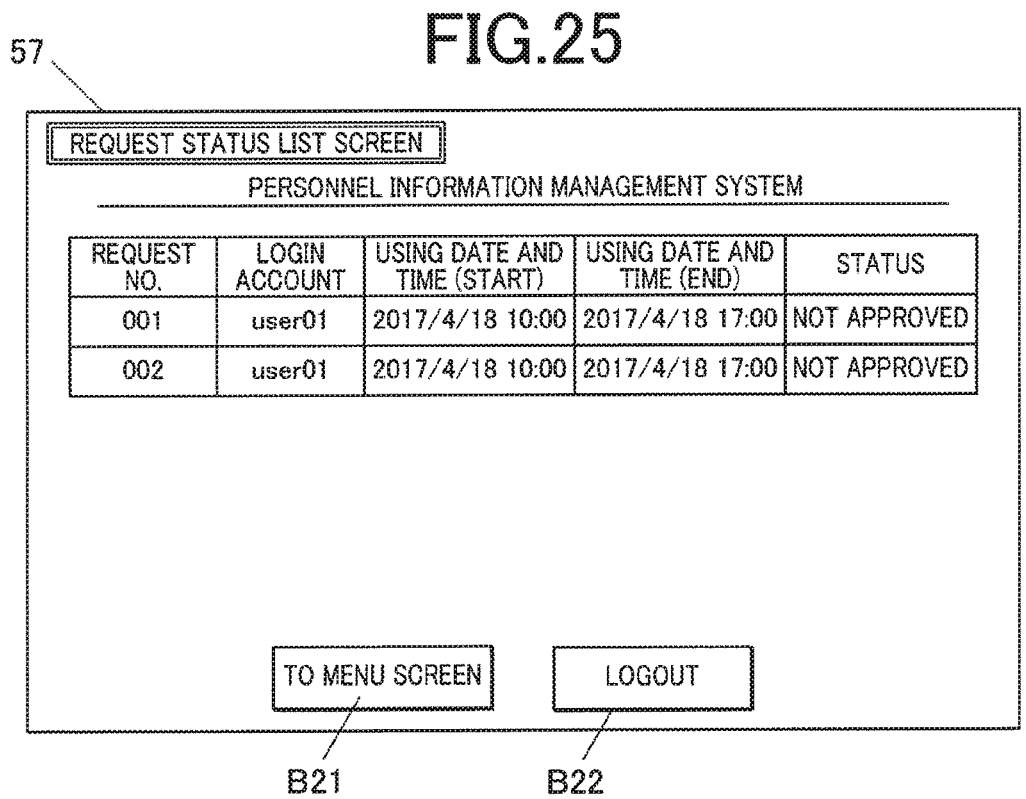
FIG. 25 is a view showing a request status list screen.

FIG. 25 is a view showing the request status list screen 57. On the request status list screen 57, there are displayed "request No.", "login account", "using date and time (start and end)", "status" and the like for each use request which is currently requested. Among them, the "status" indicates the approval status of the request by the manager of the personnel information management system. Among the use requests, when an input operation to select a line of the target to be approved or rejected, an approval screen for approving or rejecting the individual use request is displayed. On the request status list screen 57, there are displayed a button B21 for returning to the personnel information management menu screen 56, and a logout button B22 for logging out from the personnel information management system. On the request status list screen 57, there may be displayed a list of all the use requests which have been made before, or the list may exclude the use requests for which the using date and time (end) elapsed and the use requests which was approved or rejected. These can be appropriately set by the manager.

FIG. 26 is a view showing the approval screen 58. On the approval screen 58, there are displayed the input contents on the use request screen 52 in FIG. 15, a selection approval screen display button B23 for displaying the selection approval screen of the intended use, use target person (employee) and the use target item (output item), and a return button B24 for returning to the request status list screen 57.

By performing an input operation to select the selection approval screen display button B23, the business information management system user can display the selection approval screen to display the use target person and the use target item which were selected when the use request was performed on the use request screen 52 in FIG. 15.

Figure 27:
FIG. 27 is a view showing a selection approval screen.

FIG. 27 is a view showing the selection approval screen 59. On the selection approval screen 59, there are displayed the selected contents (use target person (employee) and use target item (output item)) on the item selection screen 53 in FIG. 12, the electronic business form corresponding to the selected contents, an approval button B25 for approving the use request of the selected contents, a rejection button B26 for rejecting the use request, and a return button B27 for returning to the request status list screen 57. On the selection approval screen 59, for example, in a case where a plurality of use target items is displayed, the item to approve can be individually selected by an input operation to the check box corresponding to each use target item.

In the example of FIG. 27, the employee book (form 1) of the use target person "1001 AOKI SHIGERU" is displayed, and the area of the use target item "1020 family" of this employee book (form 1) is displayed in the thick frame. Here, when an input operation to select the approval button B25 is performed, the processing to approve the use request is performed, the item of status on the request status list screen 51 of the display 35 of the business information management system user is updated to the display of "approved", and the respective items of the status of the request employee table 13j and the request output item table 13k in FIGS. 17A and 17B are updated to "approved" and registered. The email in FIG. 18 is transmitted to the business information management system user who made the use request. On the other hand, when an input operation to select the rejection button B26 is performed, the use request is not approved, the item of status on the request status list screen 51 of the display 35 of the business information management system user is updated to be displayed "rejected", and the respective items of status of the request employee table 13j and the request output item table 13k in FIGS. 17A and 17B are updated to "rejected" and registered.

Next, a control procedure of system basic processing including use request reception processing and electronic business form display processing in the personnel information management system will be described.

Figure 28:
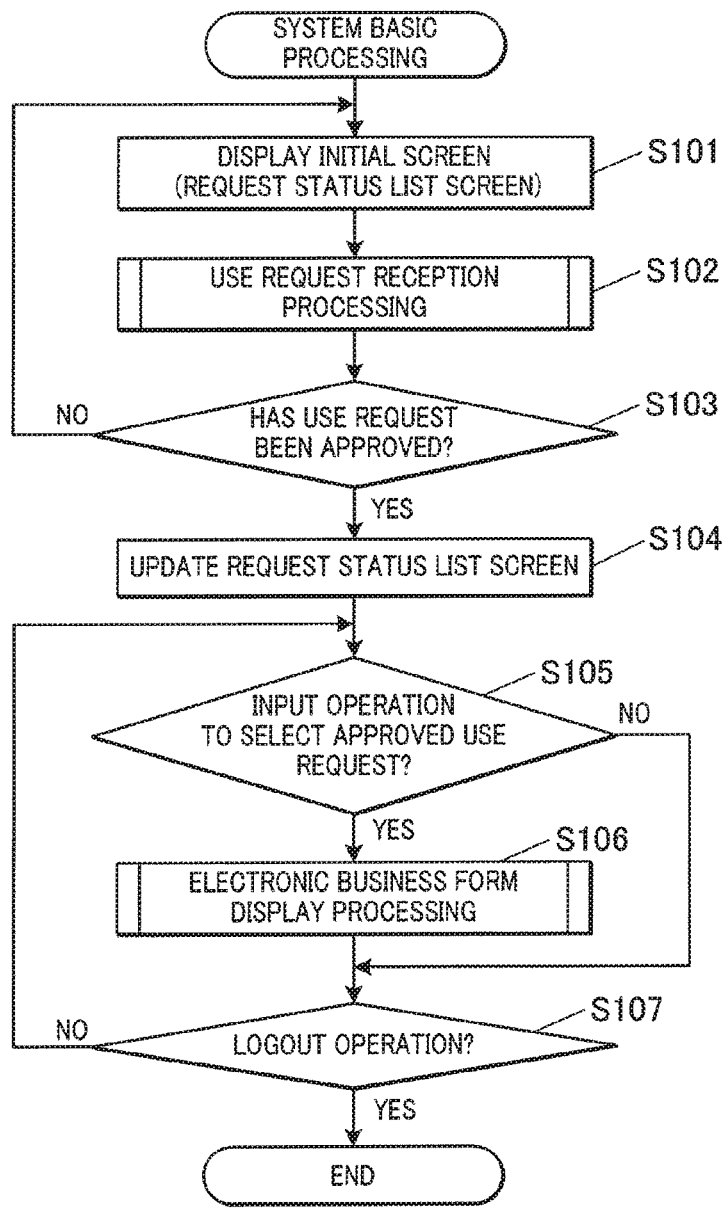
FIG. 28 is a flowchart showing a control procedure of system basic processing.

FIG. 28 is a flowchart showing a control procedure of the system basic processing.

This system basic processing is executed when login to the personnel information management system is performed by the second login method via the business information management system.

When the system basic processing is started, the CPU 11 causes the display 35 of the terminal device 3 to display the request status list screen 51 in the state shown in FIG. 8 as the initial screen (step S101), and to display the use request screen 52 in FIG. 9 according to the input operation to the request screen display button B5 and executes after-mentioned use request reception processing (step S102).

The CPU 11 determines whether the use request which was received in step S102 is approved by the manager (step S103).

In step S103, if it is determined that the use request was rejected (step S103; NO), the CPU 11 returns the processing to step S101.

On the other hand, in step S103, if it is determined that the use request was approved (step S103; YES), the CPU 11 updates the request status list screen 51 as in FIG. 19 (step S104).

The CPU 11 determines whether an input operation to select the line of the approved use request was performed via the operator 34 (step S105).

In step S105, if it is determined that the input operation to select the line of the approved use request was performed (step S105; YES), the CPU 11 executes after-mentioned electronic business form display processing (step S106) and proceeds to step S107.

On the other hand, in step S105, if it is not determined that the input operation to select the line of the approved use request was performed (step S105; NO), the CPU 11 skips step S106 and proceeds to step S107.

The CPU 11 determines whether the logout operation was performed (step S107).

In step S107, if it is not determined that the logout operation was performed (step S107; NO), the CPU 11 returns to step S105.

On the other hand, in step S107, if it is determined that the logout operation was performed (step S107; YES), the CPU 11 ends the system basic processing. The processing to end the system basic processing on the basis of the determination result of the logout operation may be performed at other arbitrary timings during execution of the system basic processing.

Figure 29:
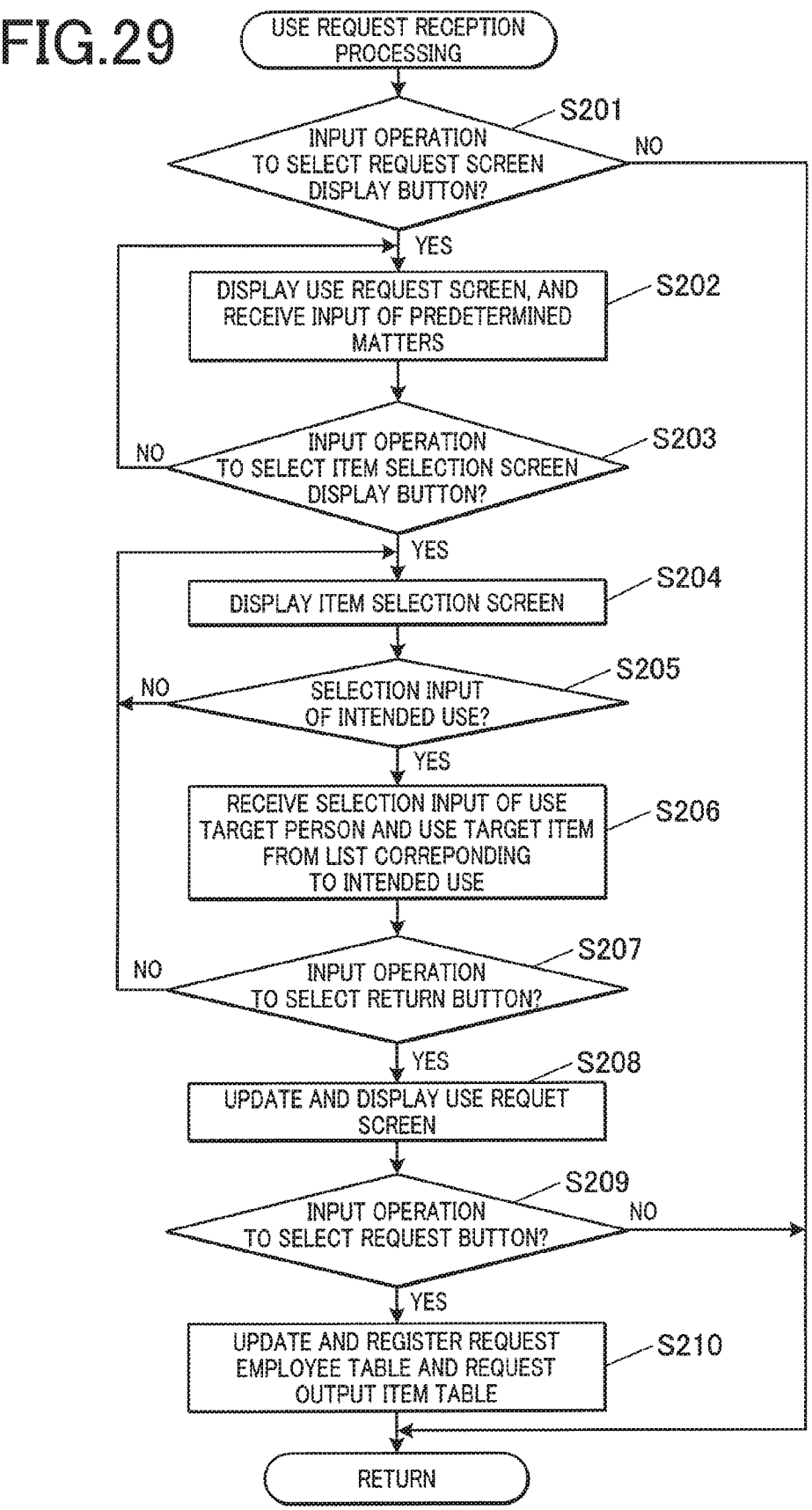
FIG. 29 is a flowchart showing a control procedure of a use request reception processing.

FIG. 29 is a flowchart showing a control procedure of the use request reception processing.

When the use request reception processing is invoked, the CPU 11 determines whether the input operation to select the request screen display button B5 was performed on the request status list screen 51 (step S201).

In step S201, if it is not determined that the input operation to select the request screen display button B5 was performed (step S201; NO), the CPU 11 ends the use request reception processing and returns to the system basic processing.

On the other hand, in step S201, if it is determined that the input operation to select the request screen display button B5 was performed (step S201; YES), the CPU 11 causes the use request screen 52 in FIG. 9 to be displayed, and receives input of the predetermined matters (requester name, email address, employee number and using date and time (start and end)) via the operator 34 (step S202).

The CPU 11 determines whether the input operation to select the item selection screen display button B7 was performed on the use request screen 52 (step S203).

In step S203, if it is not determined that the input operation to select the item selection screen display button B7 was performed (step S203; NO), the CPU 11 returns to step S202.

On the other hand, in step S203, if it is determined that the input operation to select the item selection screen display button B7 was performed (step S203; YES), the CPU 11 causes the item selection screen 53 in FIG. 10 to be displayed (step S204).

The CPU 11 determines whether selection input of intended use was performed on the item selection screen 53 (step S205).

In step S205, if it is not determined that the selection input of intended use was performed (step S205; NO), the CPU 11 returns to step S204.

On the other hand, in step S205, if it is determined that the selection input of intended use was performed (step S205; YES), as shown in FIG. 12, the CPU 11 receives selection input of the use target person (employee) and the use target item (output item) via the operator 34 from the employee list L2 and the item list L3 according to the intended use (step S206).

The CPU 11 determines whether input operation to select the return button B12 was performed on the item selection screen 53 (step S207).

In step S207, if it is not determined that the input operation to select the return button B12 was performed (step S207; NO), the CPU 11 returns to step S204.

On the other hand, in step S207, if it is determined that the input operation to select the return button B12 was performed (step S207; YES), the CPU 11 updates the use request screen 52 as in FIG. 15, that is, causes the intended use, the use target person and the use target item, which were selected and input, to be displayed (reflected) (step S208).

The CPU 11 determines whether an input operation to select the request button B13 was performed on the use request screen 52 in FIG. 15 (step S209).

In step S209, if it is not determined the input operation to select the request button B13 was performed (step S209; NO), the CPU 11 ends the use request reception processing and returns to the system basic processing.

On the other hand, in step S209, if it is determined that the input operation to select the request button B13 was performed (step S209; YES), the CPU 11 updates and registers the request employee table 13*j* in FIG. 17A and the request output item table 13*k* in FIG. 17B on the basis of data on the intended use, the use target person and the use target item which were selected and input (step S210), and returns to the system basic processing.

FIG. 30 is a flowchart showing a control procedure of the electronic business form display processing.

When the electronic business form display processing is invoked, the CPU 11 refers to the intended use table 13*g*, the restriction removal table 13*l*, restriction item table 13*m* and keyword table 13*n* to cause the removal operation window 54 to be displayed on the viewing screen 54 as in FIG. 20, the removal operation window 54 urging the user to perform removal operation according to the intended use which was selected in the use request reception processing, and the CPU 11 receives the input of the removal operation (step S301).

The CPU 11 determines whether an input operation to end the display of the viewing screen 54 was performed (step S302).

In step S302, if it is determined that the input operation to end the display of the viewing screen 54 was performed (step S302; YES), the CPU 11 ends the electronic business form display processing, and returns to the system basic processing.

On the other hand, in step S302, if it is not determined that the input operation to end the display of the viewing screen 54 was performed (step S302; NO), the CPU 11 determines whether the input removal operation satisfies the removal condition (step S303).

In step S303, if it is not determined that the input removal operation satisfies the removal condition (step S303; NO), the CPU 11 returns to step S302.

On the other hand, in step S303, if it is determined that the input removal operation satisfies the removal condition (step S303; YES), the CPU 11 decides the electronic business form corresponding to the use target item (output item) which was selected in step S206 from the business form output table 13*d* and the output item table 13*f*, and obtains the information corresponding to the selected use target item and the decided electronic business form (step S304).

The CPU 11 obtains the electronic business form which was decided in step S304, and the data on the employee table 13*e* corresponding to the use target person (employee) which was selected in step S206, and generates preview data of the electronic business form of the selected use target person by using the obtained data (step S305).

The CPU 11 uses the information on the "start point coordinate X", "start point coordinate Y", "end point coordinate X" and "end point coordinate Y" of the selected use target item (output item) in the information obtained in step S304, cuts out the area surrounded by these coordinates from the preview data generated in step S305, and obtains the cut image data (step S306).

The CPU 11 determines whether there is another use target item (output item) selected in step S206 (step S307).

In step S307, if it is determined that there is another use target item (step S307; NO), the CPU 11 returns to step S304.

On the other hand, in step S307, if it is not determined that there is another use target item (step S307; YES), the CPU 11 attaches the title information (employee code and the employee name) of the use target person (employee) selected in step S206 to the image data which was obtained in step S306, causes the display 35 to display the image data (registration information D) (step S308), and returns to the system basic processing.

Specifically, for example, in a case where only the image data corresponding to the item of the "1020 family" is obtained in step S306, the title information of the use target person (employee) selected in step S206 is attached to the image data, and the image data (registration information D) is displayed on the viewing screen 54 as in FIG. 21.

As described above, according to the embodiment, the personnel information management server 1 in the information processing system 100 receives, from a terminal device 3 (first user terminal), a use request (display request) of an electronic business form (electronic document) on which a display restriction is imposed, the electronic business form being accompanied by an intended use of the electronic business form. The personnel information management server 1 receives approval of the received use request, and sets a restriction removal condition which was determined in advance in association with the intended use accompanying the use request when the approval of the use request was received.

Thus, even in a case where the approval of the use request was received, it is possible not to allow displaying the electronic business form for which the use request was made unless the restriction removal condition is satisfied. Therefore, it is possible to strengthen authentication when the approved electronic business form is displayed. Since there is set the restriction removal condition which is determined in advance in association with the intended use accompanying the use request, it is possible to appropriately perform authentication when the electronic business form is displayed.

The personnel information management server 1 notifies a terminal device 3 (second user terminal) of the received use request (display request), and receives the approval of the use request from the notified terminal device 3. Thus, since the approval of the use request can be performed by a specific person such as a manager of the personnel information management server 1, it is possible to enhance the security of the registration information D.

When a predetermined input operation to specify the electronic business form (electronic document) on which the display restriction is imposed is performed by the terminal device 3 (first user terminal), the personnel information management server 1 determines whether the restriction removal condition is satisfied. If it is determined that the restriction removal condition is satisfied, the personnel information management server 1 removes the display restriction imposed on the electronic business form. Thus, since the electronic business form for which the use request was made is displayed by satisfaction of the restriction removal condition, it is possible to strengthen the authentication when the electronic business form is displayed.

When the personnel information management server 1 requests selecting a desired item from among a plurality of items included in the electronic business form (electronic document), the personnel information management server 1 requests selecting the desired item from among a plurality of items which was determined in advance in association with the intended use among the plurality of items included in the electronic business form. Thus, it is possible to prevent items not suitable for the intended use from being selected.

When the personnel information management server 1 receives the use request (display request) of the registration information D corresponding to the desired item among the plurality of items included in the electronic business form (electronic document) from the terminal device 3 (first user terminal), the personnel information management server 1 causes a display 35 of the terminal device 3 to display a template of the electronic business form. Thus, since an image of the selected item can be easily grasped, it is possible to suppress selection of unintended items.

When the desired item is selected on the basis of a predetermined operation of the terminal device 3 (first user terminal), the personnel information management server 1 causes the display 35 to display, with emphasis, an item in the template corresponding to the desired item. Thus, it is possible to check the item selected by the user even in the template. Thus, it is possible to more suppress the selection of unintended items.

Though the above description describes an example of using an HDD and an SDD of the storage 13 as a computer readable medium of a program according to the present invention, the medium is not limited to this example. As other computer readable medium, a portable storage medium such as a flash memory and a CD-ROM can be applied. A carrier wave may also be applied to the present invention as a medium providing the program data according to the present invention via a communication line.

The description in the above embodiment is an example of an information processing device, an information processing method and a storage medium according to the present invention, and the present invention is not limited to the above embodiment.

For example, though the embodiment takes, as an example, the personnel information management server 1 which provides a personnel information management system as the information processing device, the present invention is not limited to this. For example, the present invention can be applied to an information processing device which provides an arbitrary system of displaying an electronic business form.

In the embodiment, when the use target item desired by the user is selected on the item selection screen 53 (see FIG. 12), an input operation to select the check box A11 corresponding to the use target item desired by the user is performed from the item list L3 displayed on the right side of the screen. However, the method for selecting the use target item is not limited to the above example. For example, the use target item desired by the user may be able to be selected by an input operation (for example, touch operation) of directly selecting each item in the sample of the electronic business form which is displayed on the item selection screen 53.

In the embodiment, when the use target item desired by the user is selected on the item selection screen 53 (see FIG. 12), selection of the item is emphasized by displaying the corresponding item in the sample of the electronic business form in the thick frame in accordance with the selection of the use target item. However, the present invention is not limited to the above example as long as the selected item can be emphasized. For example, when the use target item desired by the user is selected, the display color of the area of the corresponding item in the sample of the electronic business form may be differentiated from the display color of the area of the other items in accordance with the selection of the use target item.

In the embodiment, use target persons (employees) and the use target items (output items) which can be selected are different according to the intended use which was selected on the item selection screen 53 (see FIG. 12). However, for example, the length of a using period may be calculated from data on using date and time (start and end) input on the use request screen 52 in FIG. 9 to limit, according to the length of the using period, the use target persons (employees) and the use target items (output items) which can be selected.

It goes without saying that the detailed configurations and the detailed operations of the components in the information processing system 100 in the embodiment can be appropriately changed within the scope of the present invention.

Although embodiments of the present invention have been described, the scope of the present invention is not limited to the above described embodiments and includes the scope of the present invention that is described in the claims and the equivalents thereof.

What is claimed is:

1. An electronic business form management device comprising:
   a memory that stores a table associating each of a plurality of business tasks with an item of an electronic document which needs to be viewed in the business task; and
   a processor that performs:
   reception processing of receiving, from a first user terminal, an intended use indicating a business task among the plurality of business tasks that needs viewing of an electronic document on which a display restriction is imposed, as a display request of the electronic document;
   determination processing of determining whether the display request is approved by a second user terminal; and
   setting processing of setting a predetermined restriction removal condition to an item of the electronic document corresponding to the intended use received in the reception processing based on the table stored in the memory when the display request is determined to be approved by the second user terminal in the determination processing.

2. The electronic business form management device according to claim 1, wherein the processor performs display control processing of causing a display of the first user terminal to display first selection information for selecting the business task that needs the viewing of the electronic document when the intended use is received in the reception processing.

3. The electronic business form management device according to claim 2, wherein
the electronic document includes a plurality of items, and
in the reception processing, the processor receives, from the first user terminal, a use item indicating an item for which the viewing is desired among the plurality of items as the display request.

4. The electronic business form management device according to claim 3, wherein, in the display control processing, when the use item is received in the reception processing, the processor causes the display of the first user terminal to display second selection information for selecting the item for which the viewing is desired from among the plurality of items.

5. The electronic business form management device according to claim 3, wherein, in the reception processing, the processor receives the intended use before the use item and receives the item for which the viewing is desired from among a plurality of items corresponding to the intended use.

6. An electronic business form management method executed in an electronic business form management device including a memory that stores a table associating each of a plurality of business tasks with an item of an electronic document which needs to be viewed in the business task, the method comprising:
a receiving step of receiving, from a first user terminal, an intended use indicating a business task among the plurality of business tasks that needs viewing of an electronic document on which a display restriction is imposed, as a display request of the electronic document;
a determination step of determining whether the display request is approved by a second user terminal; and
a setting step of setting a predetermined restriction removal condition to an item of the electronic document corresponding to the intended use received in the receiving step based on the table stored in the memory when the display request is determined to be approved by the second user terminal in the determination step.

7. A non-transitory computer readable storage medium storing a program that is executable by a processor of an electronic business form management device and causes the processor to execute following processing, the electronic business form management device including a memory that stores a table associating each of a plurality of business tasks with an item of an electronic document which needs to be viewed in the business task, and the processing comprising:
reception processing of receiving, from a first user terminal, an intended use indicating a business task among the plurality of business tasks that needs viewing of an electronic document on which a display restriction is imposed, as a display request of the electronic document;
determination processing of determining whether the display request is approved by a second user terminal; and
setting processing of setting a predetermined restriction removal condition to an item of the electronic document corresponding to the intended use received in the reception processing based on the table stored in the memory when the display request is determined to be approved by the second user terminal in the determination processing.

* * * * *